(12) United States Patent
Takahashi

(10) Patent No.: US 11,022,211 B2
(45) Date of Patent: Jun. 1, 2021

(54) VEHICLE SHIFT CONTROL DEVICE

(71) Applicant: SUZUKI MOTOR CORPORATION, Hamamatsu (JP)

(72) Inventor: Hideaki Takahashi, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 315 days.

(21) Appl. No.: 15/666,116

(22) Filed: Aug. 1, 2017

(65) Prior Publication Data

US 2018/0045300 A1 Feb. 15, 2018

(30) Foreign Application Priority Data

Aug. 15, 2016 (JP) .............................. JP2016-159098

(51) Int. Cl.
*F16H 59/04* (2006.01)
*B62M 25/06* (2006.01)
(Continued)

(52) U.S. Cl.
CPC .......... *F16H 59/044* (2013.01); *B62K 23/08* (2013.01); *B62M 7/02* (2013.01); *B62M 25/06* (2013.01); *F16H 61/32* (2013.01); *F16H 63/14* (2013.01); *F16H 63/46* (2013.01); *B60Y 2200/12* (2013.01); *B62M 2025/006* (2013.01); *F16H 3/091* (2013.01); *F16H 61/36* (2013.01);
(Continued)

(58) Field of Classification Search
CPC ............ F16H 2059/0234; F16H 61/32; F16H 59/044; B62M 7/02; B62M 25/06
See application file for complete search history.

(56) References Cited

U.S. PATENT DOCUMENTS

2004/0139795 A1* 7/2004 Kawakubo ............. B62M 25/06
73/115.03
2007/0026994 A1* 2/2007 Matsuda ................. F16H 59/68
477/92
(Continued)

FOREIGN PATENT DOCUMENTS

| JP | 2008-132868 A | 6/2008 |
|----|---------------|--------|
| JP | 2011-196434 A | 10/2011 |
| JP | 5722165 B2 | 4/2015 |

OTHER PUBLICATIONS

Japanese Office Action dated Mar. 31, 2020, issued to Japanese Application No. 2016-159098.

*Primary Examiner* — William Kelleher
*Assistant Examiner* — Gregory T Prather
(74) *Attorney, Agent, or Firm* — Stein IP, LLC

(57) ABSTRACT

There is provided a vehicle shift control device. A shift mechanism is configured to shift and transmit rotation of a crankshaft extending in a width direction of a vehicle to a driving wheel. A shift pedal is configured to receive a shifting operation for the shift mechanism. A shift detection mechanism is configured to detect a shift instructed via the shift pedal. A shift actuator is configured to perform a shift operation of the shift mechanism, in response to a detection content of the shift detection mechanism. The shift detection mechanism includes a detection unit configured to rotate in response to the shifting operation of the shift pedal and a sensor configured to detect rotation of the detection unit. A rotary shaft of the detection unit and a rotary shaft of the sensor are arranged at different positions, as seen from a side.

8 Claims, 17 Drawing Sheets

(51) Int. Cl.
  *B62M 7/02* (2006.01)
  *F16H 63/14* (2006.01)
  *F16H 63/46* (2006.01)
  *F16H 61/32* (2006.01)
  *B62K 23/08* (2006.01)
  *B62M 25/00* (2006.01)
  *F16H 61/36* (2006.01)
  *F16H 3/091* (2006.01)
  *F16H 59/02* (2006.01)

(52) U.S. Cl.
  CPC ............... *F16H 2059/0234* (2013.01); *F16H 2059/0239* (2013.01)

(56) References Cited

U.S. PATENT DOCUMENTS

| | | | |
|---|---|---|---|
| 2007/0284849 A1* | 12/2007 | Kosugi | B62M 25/06 280/288.4 |
| 2008/0125285 A1 | 5/2008 | Takeuchi | |
| 2009/0038425 A1* | 2/2009 | Takeuchi | F16D 1/0858 74/337 |
| 2009/0266192 A1* | 10/2009 | Shiozaki | F16H 63/18 74/337.5 |
| 2013/0055841 A1* | 3/2013 | Nakamura | B62M 25/06 74/473.16 |
| 2013/0133457 A1* | 5/2013 | Sakamoto | F16H 59/02 74/473.12 |
| 2014/0095033 A1* | 4/2014 | Kojima | F16H 61/0204 701/52 |
| 2016/0091089 A1* | 3/2016 | Nakamura | F16H 63/16 74/337.5 |
| 2017/0204971 A1* | 7/2017 | Nakai | F16H 59/0217 |
| 2018/0209538 A1* | 7/2018 | Makita | F16H 61/32 |

* cited by examiner

VEHICLE SHIFT CONTROL DEVICE

CROSS-REFERENCE TO RELATED APPLICATIONS

The disclosure of Japanese Patent Application No. 2016-159098 filed on Aug. 15, 2016, including specification, drawings and claims is incorporated herein by reference in its entirety.

TECHNICAL FIELD

The disclosure relates to a vehicle shift control device.

BACKGROUND

In recent years, a motorcycle mounted with an automatic manual transmission (AMT) or a dual clutch transmission (DCT) as a transmission device having both excellent mechanical efficiency derived from a manual transmission and convenience derived from an automatic transmission has been increasingly used. The AMT is provided with a shift actuator for use in a shift operation. The shift actuator is configured to be driven in response to a shifting operation on an operation pedal and to perform shift control in a shift mechanism.

In the related art, there is suggested a shift control device for a saddle-ridden type vehicle in which a moveable range of an operation pedal and a moveable range of a moveable part such as a click mechanism are offset in a width direction of the vehicle and the operation pedal and the moveable part are arranged so as to come close to each other (for example, refer to Patent Document 1). In such a shift control device, it is possible to closely arrange the moveable part and the operation pedal while avoiding any interference therebetween upon operation thereof. Accordingly, it is possible to reduce a space occupied by the moveable part and the operation pedal, to increase layout properties of an engine and a vehicle body.

Patent Document 1: Japanese Patent No. 5,722,165 (Specification and FIG. 6)

However, according to the shift control device disclosed in Patent Document 1, the moveable range of the operation pedal and the moveable range of the moveable part are offset in the width direction of the vehicle. For this reason, a dimension of the entire shift detection mechanism in the width direction of the vehicle increases.

SUMMARY

It is therefore an object of the disclosure to provide a vehicle shift control device capable of shortening a dimension of a shift detection mechanism in a width direction of a vehicle.

According to an aspect of the embodiments of the present invention, there is provided a vehicle shift control device comprising: a shift mechanism configured to shift and transmit rotation of a crankshaft extending in a width direction of a vehicle to a driving wheel; a shift pedal configured to receive a shifting operation for the shift mechanism; a shift detection mechanism configured to detect a shift instructed via the shift pedal; and a shift actuator configured to perform a shift operation of the shift mechanism, in response to a detection content of the shift detection mechanism, wherein the shift detection mechanism comprises a detection unit configured to rotate in response to the shifting operation of the shift pedal and a sensor configured to detect rotation of the detection unit, and a rotary shaft of the detection unit and a rotary shaft of the sensor are arranged at different positions, as seen from a side.

According to the above configuration, since the rotary shaft of the detection unit configured to rotate in response to the shifting operation of the shift pedal and the rotary shaft of the sensor configured to detect the rotation of the detection unit are arranged at the different positions, as seen from the side, it is possible to shorten a dimension of the shift detection mechanism in the width direction of the vehicle, as compared to a configuration in which the rotary shafts are coaxially arranged.

In the vehicle shift control device, the shift detection mechanism may comprise a cover configured to accommodate therein the detection unit, and the cover may be mounted to a sprocket cover. According to the above configuration, since the cover configured to accommodate therein the detection unit is mounted to the sprocket cover, the sprocket cover and the cover of the shift detection mechanism are arranged outside the drive chain. With the double structure of the sprocket cover and the cover, it is possible to achieve a sound deadening effect and to reduce a driving sound caused due to the rotation of the drive chain.

In the vehicle shift control device, the sensor may be arranged outside the cover. According to the above configuration, since the sensor configured to detect the rotation of the detection unit is arranged in the space different from the detection unit with the cover being interposed therebetween, it is possible to prevent a situation where the sensor is to be damaged due to foreign matters involved by the drive chain.

In the vehicle shift control device, the shift mechanism may be arranged below a counter shaft which is arranged behind the crankshaft in parallel with the crankshaft. According to the above configuration, since the shift mechanism is arranged below the counter shaft, even when the vehicle shift control device according to the disclosure is applied to a vehicle in which the shift actuator and the like are not provided, it is possible to approximate the extending direction of the shift pedal. Accordingly, it is possible to apply the disclosure to a vehicle having a different specification without considerably changing a layout.

The vehicle shift control device may further comprise: a clutch mechanism provided at one end of the counter shaft and configured to transmit and disconnect rotation of the crankshaft to and from the counter shaft; and a clutch actuator configured to perform a disconnection/connection operation of the clutch mechanism, the detection unit may be arranged behind the clutch actuator, and the sensor may be arranged between the clutch actuator and the detection unit. According to the above configuration, the sensor of the shift detection mechanism is arranged in the vicinity of the clutch actuator. Accordingly, it is possible to arrange the sensor in the vicinity of the clutch actuator and inside an outer end face of the clutch actuator. Consequently, it is possible to protect the sensor which is susceptible to a shock and the like, by the clutch actuator.

According to the disclosure, it is possible to shorten the dimension of the shift detection mechanism in the width direction of the vehicle.

DETAILED DESCRIPTION OF THE EMBODIMENTS

Hereinafter, an illustrative embodiment of the present invention will be described in detail with reference to the accompanying drawings. Hereinafter, a motorcycle of a sports type will be described as an example of an object to which the motorcycle according to the present invention can be applied. However, the type of the motorcycle is not limited thereto and can be changed. For example, the present invention can also be applied to a two-wheeled vehicle of the other type, a three-wheeled vehicle of a buggy type, a four-wheeled vehicle and the like.

Figure 1:
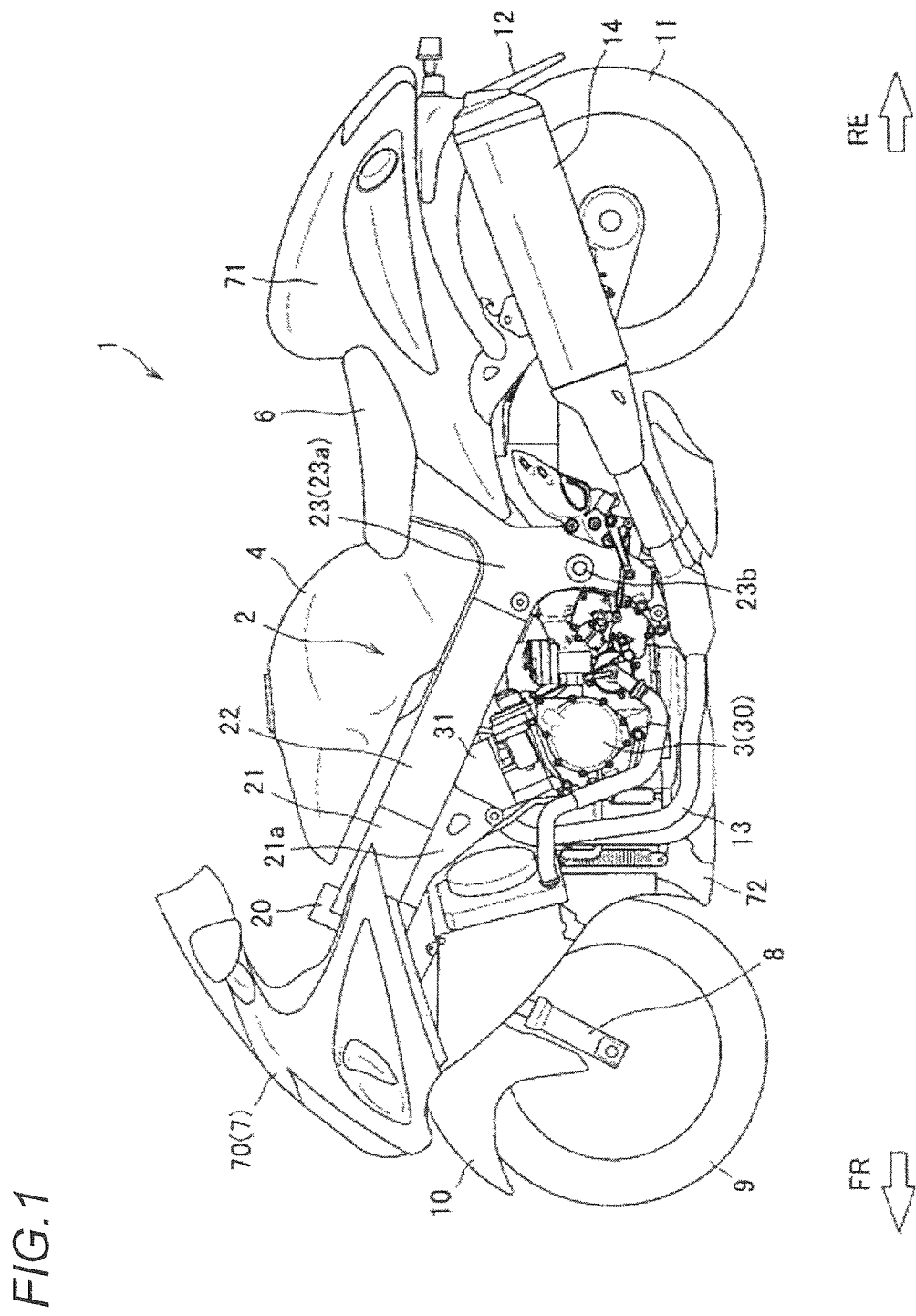
FIG. 1 is a left side view illustrating a schematic configuration of a motorcycle to which a vehicle shift control device according to an illustrative embodiment of the present invention can be applied.
Figure 2:
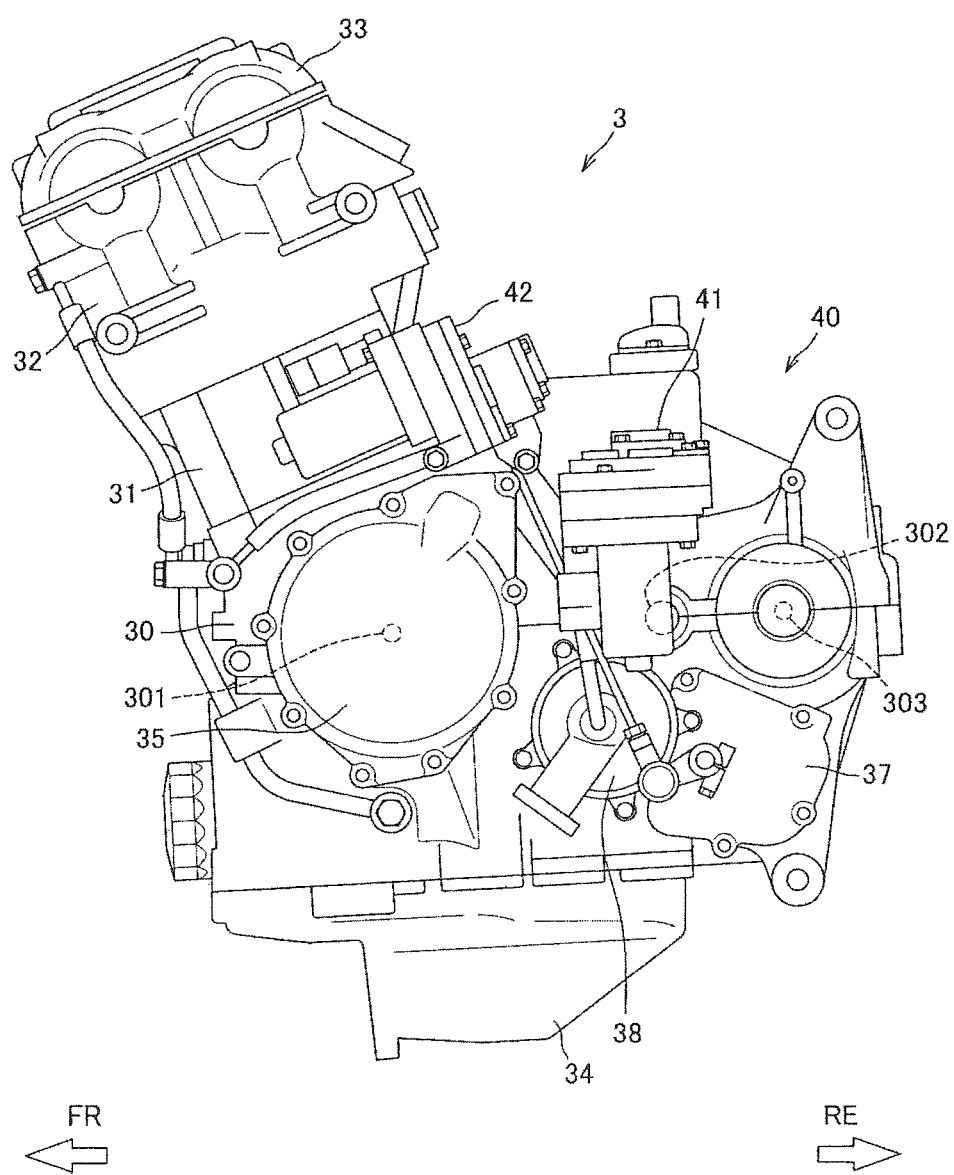
FIG. 2 is a left side view illustrating a configuration around an engine of the motorcycle according to the illustrative embodiment.

A schematic configuration of a motorcycle according to the illustrative embodiment is described with reference to FIGS. 1 and 2. FIG. 1 is a left side view illustrating a schematic configuration of a motorcycle to which a vehicle shift control device according to an illustrative embodiment can be applied. FIG. 2 is a left side view illustrating a configuration around an engine of the motorcycle according to the illustrative embodiment. Hereinafter, as to the directions, a front side of the motorcycle is denoted with an arrow FR, a rear side of the motorcycle is denoted with an arrow RE, a left side of the motorcycle is denoted with an arrow L, and a right side of the motorcycle is denoted with an arrow R. Also, in the respective drawings, some of the configurations may be omitted for convenience of explanations.

As shown in FIG. 1, the motorcycle 1 comprising a vehicle body frame 2 mounted with a power unit, an electric system and the like and an engine 3 mounted on the vehicle body frame 2. The engine 3 is, for example, a parallel four-cylinder engine. As described in detail later, the engine 3 is configured by mounting a cylinder 31, a cylinder head 32 and a cylinder head cover 33 to an upper part of an engine case (a crankcase) 30 accommodating therein a crankshaft 301 (not shown in FIG. 1, refer to FIG. 2). A lower part of the engine case 30 is provided with an oil pan 34. As described in detail later, the engine case 30 is provided with an automatic manual transmission device (AMT) 40.

The vehicle body frame 2 is a twin-spar type frame made of aluminum cast. As described above, the vehicle body frame 2 is configured to secure the entire strength of the vehicle body by mounting the engine 3 thereon. The vehicle body frame 2 as a whole extends rearwards from the front side of the motorcycle, and has a shape curved downwards at a rear end-side thereof.

Specifically, the vehicle body frame 2 has a head frame 21 bifurcating from a head pipe 20 into the right and left sides and extending rearwards, a pair of right and left tank rails 22 obliquely extending downwards towards the rear side from the head frame 21, and a body frame 23 extending downwards from rear ends of the tank rails 22.

The head frame 21 and the tank rails 22 are provided on lower surfaces thereof with a pair of right and left bracket parts 21a. The bracket parts 21a are configured to support a front part (a cylinder head 31) of the engine 3. Each of the tank rails 22 has a cylinder shape having a hollow sectional shape. A fuel tank 4 is arranged above the tank rails 22.

The body frame 23 is configured by coupling upper and lower end portions of a pair of frame parts 23a extending downwards from the rear ends of the respective tank rails 22 in a width direction of the motorcycle. A rear part of the engine 3 (a rear part of the crankcase 30) is supported by the upper and lower end portions of the body frame 23. A substantially central part of the body frame 23 in a vertical direction is provided with a swing arm pivot 23b configured to swingably support a swing arm 5. A rider seat 6 connected to the fuel tank 4 is provided above the frame parts 23a.

The vehicle body frame 2 configured as described above and the engine 3 are mounted with a variety of covers 7 as an exterior package of the vehicle body. Specifically, the front part of the vehicle body is covered by a front cowl 70, and the rear part and the lower part of the rider seat 6 are covered by a real cowl 71. The front part and the side part of the engine 3 are covered by an under cowl 72. In FIG. 1, the under cowl 72 provided at the left side of the vehicle body is omitted for convenience of explanations.

A pair of right and left front forks 8 are supported by the head pipe 20 via a steering shaft (not shown) in a steerable manner. A front wheel 9 is rotatably supported by lower end portions of the front forks 8. An upper part of the front wheel 9 is covered by a front fender 10.

The swing arm 5 extends rearwards from the swing arm pivot 23b. A rear suspension (not shown) is provided between the swing arm 5 and the body frame 23. A rear wheel 11 is rotatably supported by a rear end of the swing arm 5. An upper part of the rear wheel 11 is covered by a rear fender 12 provided on a lower surface of the real cowl 71.

Exhaust pipes 13 and a muffler 14 are connected to respective exhaust ports of the cylinder head 31. The plurality of exhaust pipes 13 extend downwards from the respective exhaust ports, are bent rearwards below the engine 3 and are integrated into one. The muffler 14 is connected to a downstream end of the exhaust pipes 13. Exhaust gas generated due to combustion of the engine 3 is introduced into the muffler 14 via the exhaust pipes 13. Then, an exhaust sound of the exhaust gas is reduced by the muffler 14, and the exhaust gas is discharged outside.

Configurations around the engine 3 of the motorcycle 1 according to the illustrative embodiment are described. As shown in FIG. 2, the crankshaft 301, a counter shaft 302 and a drive shaft 303 extending in the width direction of the motorcycle (a direction orthogonal to the paper surface of FIG. 2) are pivotally supported by the engine case 30. The crankshaft 301 is arranged below the cylinder 31. The counter shaft 302 is arranged behind the crankshaft 301. The drive shaft 303 is arranged behind the counter shaft 302.

A generator (not shown) is connected to a left end portion of the crankshaft 301. The generator is configured to generate a power as the motorcycle travels and to supply the generated power to in-vehicle devices or a battery (not shown). Also, a clutch mechanism (not shown) is connected to a right end portion of the counter shaft 302. The clutch mechanism is configured to transmit and disconnect rotation of the crankshaft 301 to and from the counter shaft 302. The generator and the clutch mechanism are respectively accommodated in a mug cover 35 and a clutch cover 36 (regarding the clutch cover 36, refer to FIG. 7). The mug cover 35 and the clutch cover 36 are mounted to the engine case 30.

A shift mechanism 37 is arranged below the counter shaft 302 and the drive shaft 303. The shift mechanism 37 is configured to shift the rotation of the crankshaft 301 and to transmit the rotation of the crankshaft to the rear wheel 11. A water pump 38 is provided in front of the shift mechanism 37. The water pump 38 is mounted to a radiator via a radiator hose 39 and is configured to circulate cooling water for cooling the engine 3. Meanwhile, in FIG. 2, for convenience of explanations, the radiator hose 39 connected to the water pump 38 is omitted (refer to FIG. 3).

The engine case 30 is provided with an automatic manual transmission (AMT) 40. The AMT 40 includes the clutch mechanism, the shift mechanism 37, a clutch actuator 41 and a shift actuator 42. The clutch actuator 41 is configured to perform a disconnection/connection operation of the clutch mechanism. The shift actuator 42 is configured to perform a shift operation of the shift mechanism 37.

Hereinafter, an arrangement of the clutch actuator 41 and the shift actuator 42 constituting the AMT 40 is described with reference to FIGS. 3 to 7. Hereinafter, a case where the clutch actuator 41 and the shift actuator 42 are arranged around the mug cover 35 is described. As described above, the clutch actuator 41 and the shift actuator 42 may also be arranged around the clutch cover 36.

Figure 3:
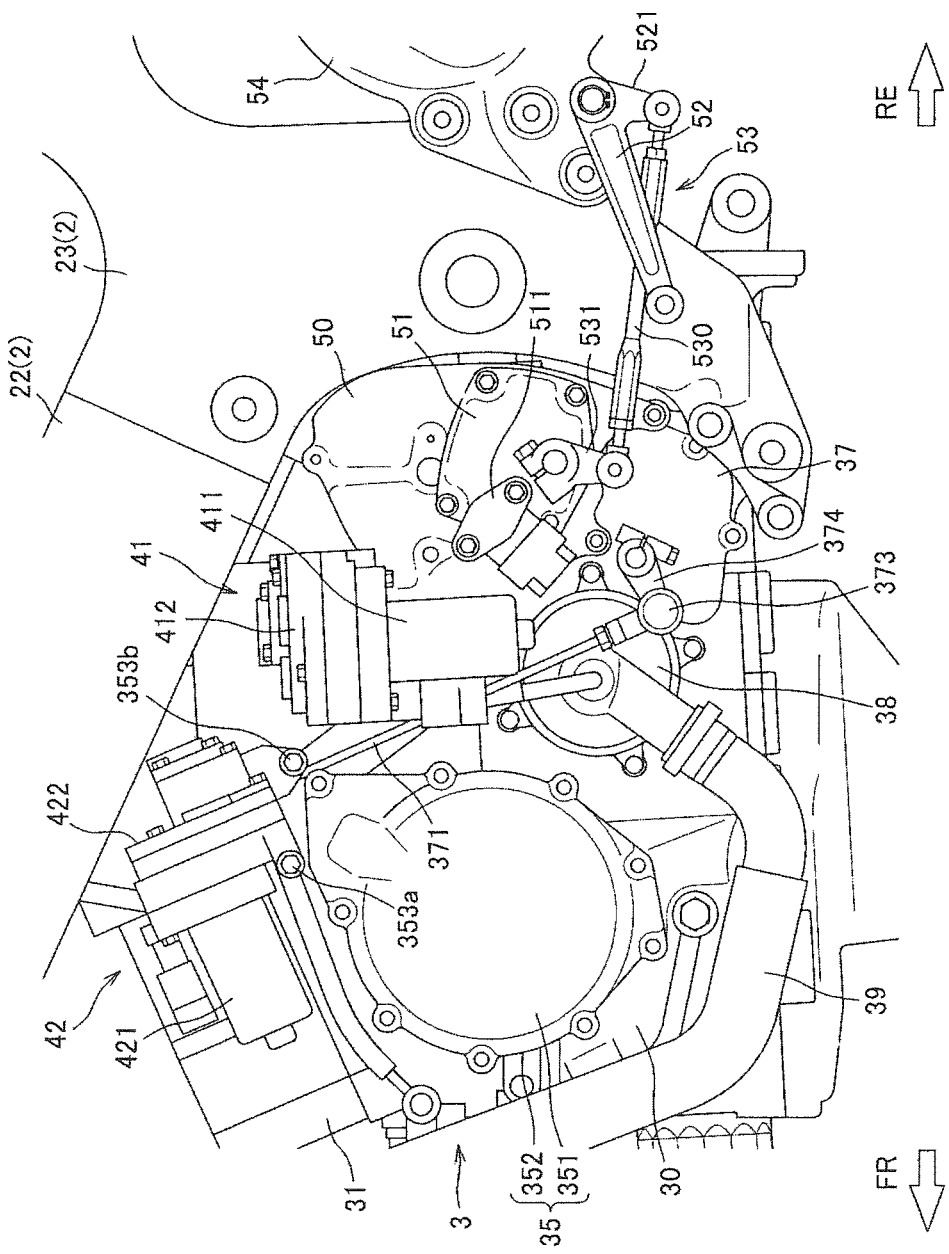
FIG. 3 is a side view of a surrounding of the engine of the motorcycle according to the illustrative embodiment.
Figure 4:
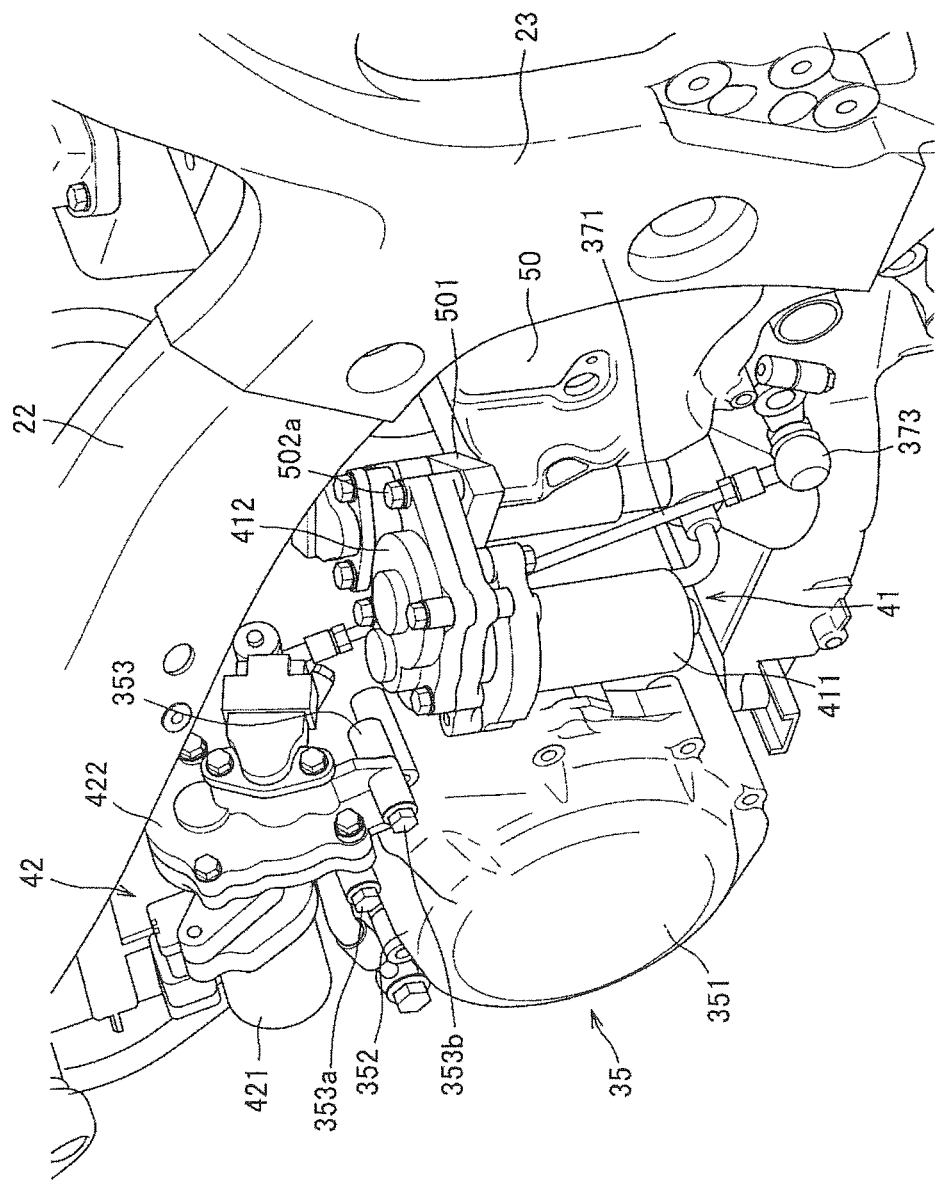
FIG. 4 is a perspective view of the surrounding of the engine of the motorcycle according to the illustrative embodiment.
Figure 5:
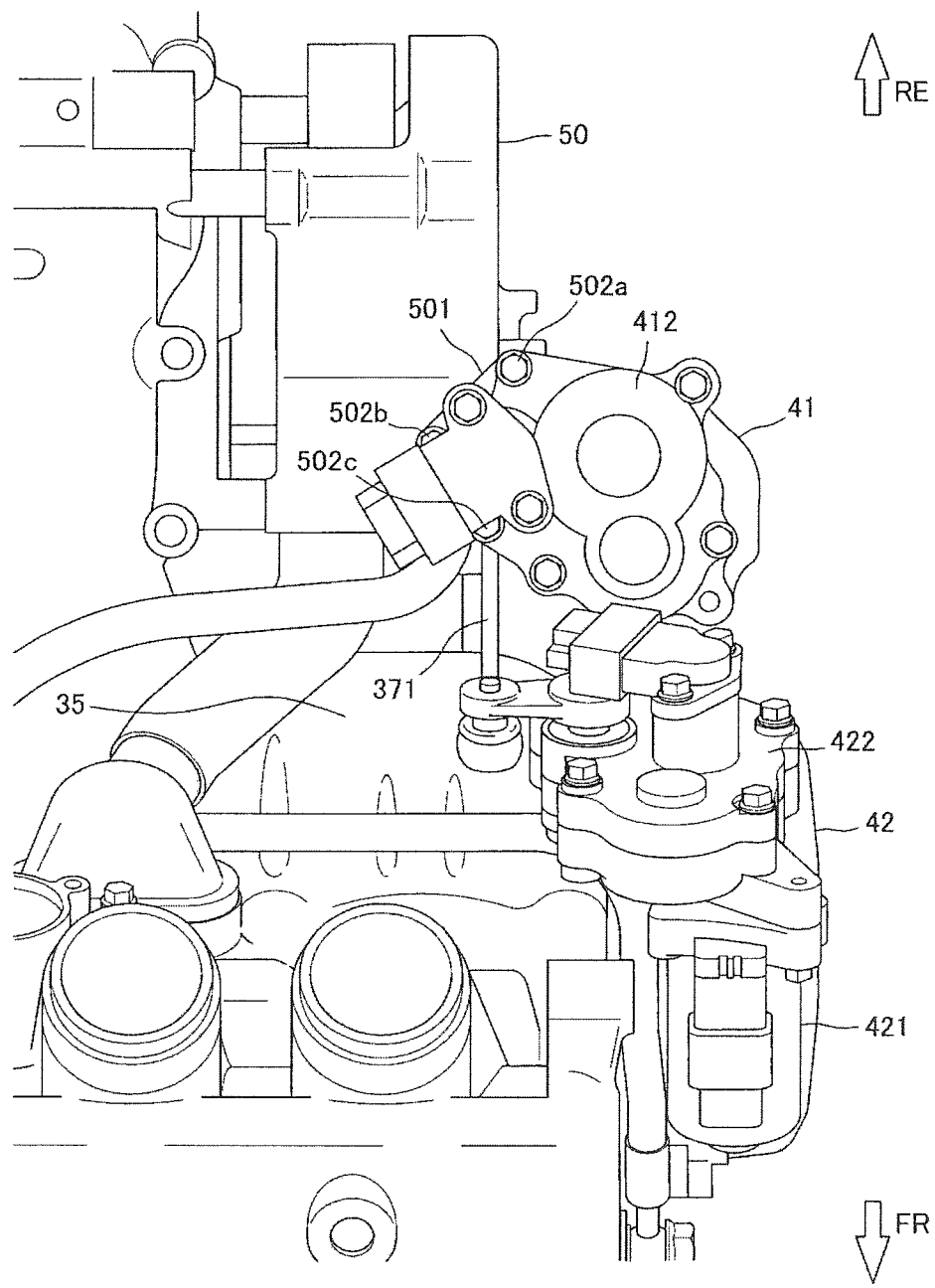
FIG. 5 is a plan view of the surrounding of the engine of the motorcycle according to the illustrative embodiment.
Figure 6:
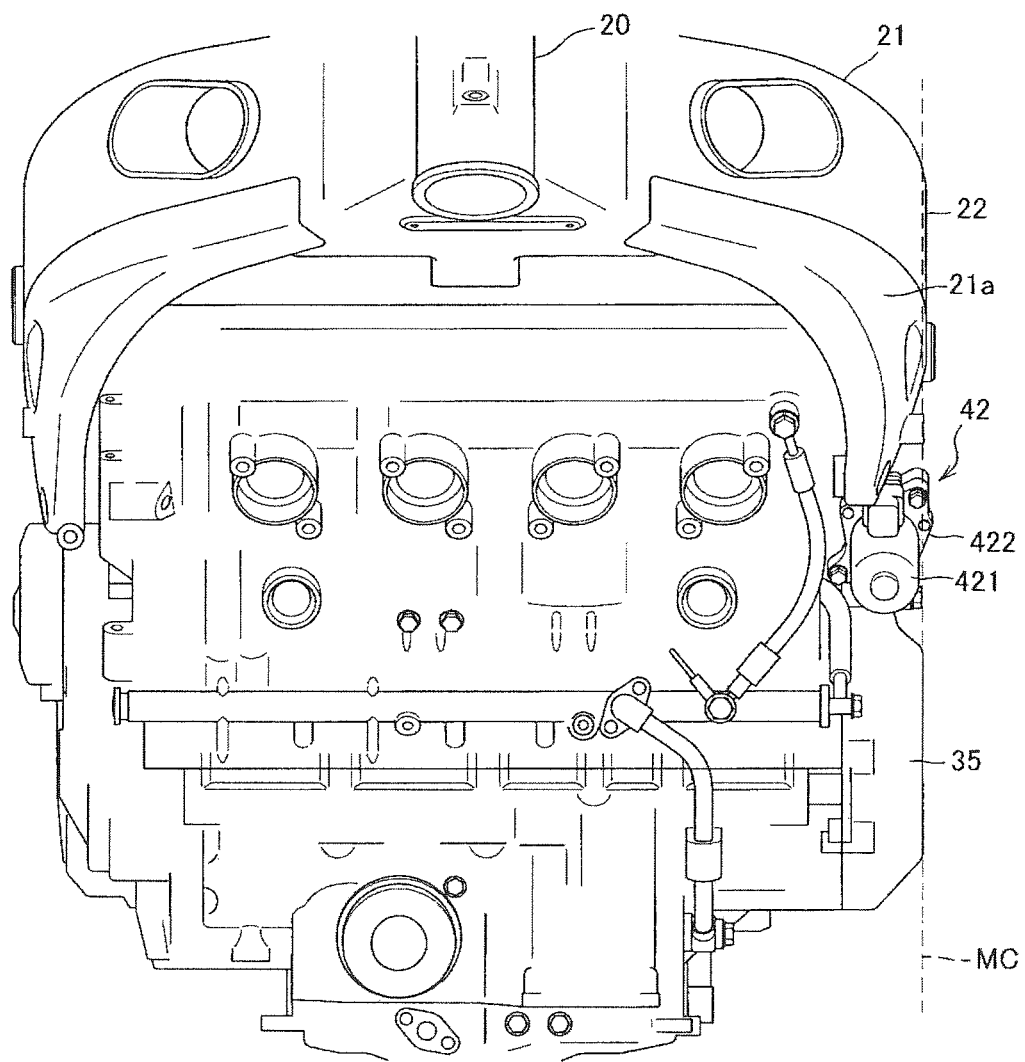
FIG. 6 is a front view of the surrounding of the engine of the motorcycle according to the illustrative embodiment.
Figure 7:
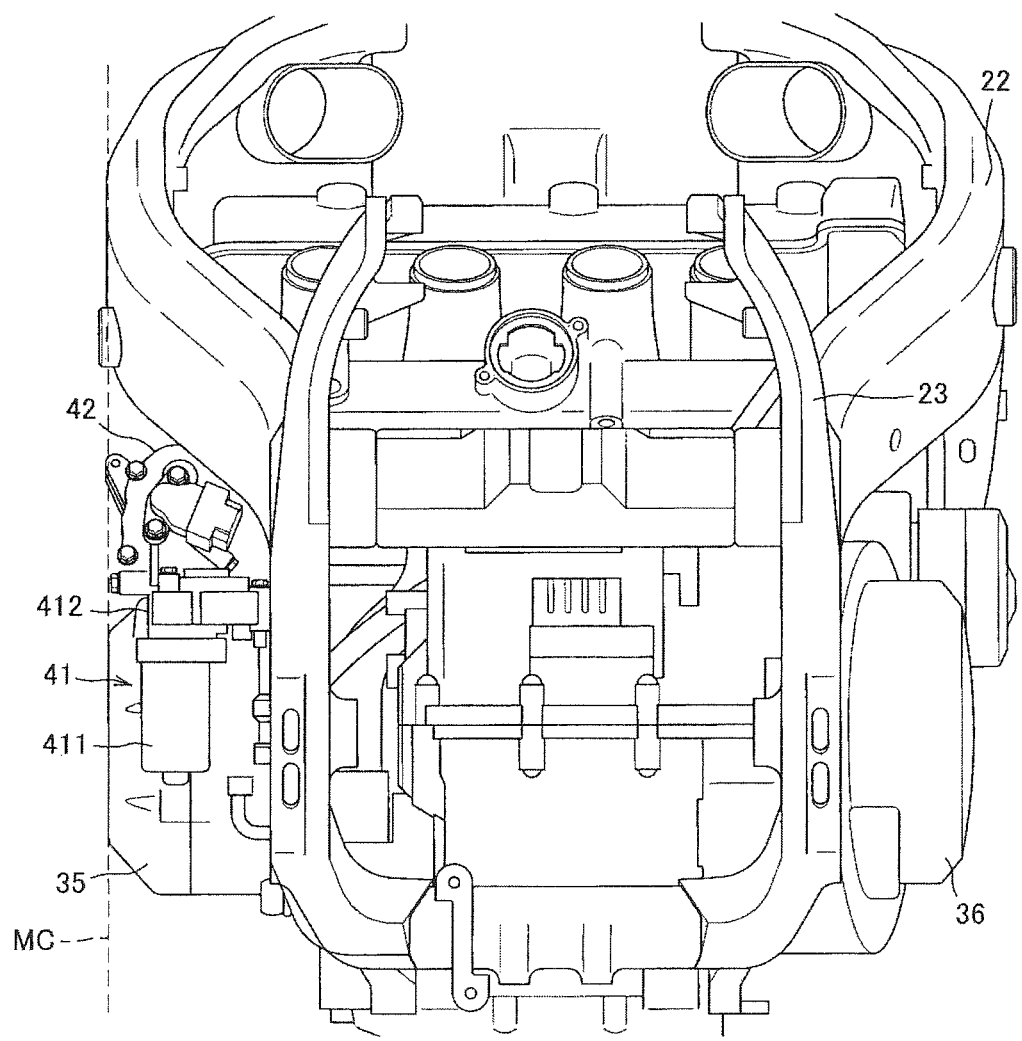
FIG. 7 is a rear view of the surrounding of the engine of the motorcycle according to the illustrative embodiment.

FIG. 3 is a side view of a surrounding of the engine 3 of the motorcycle 1 according to the illustrative embodiment. FIG. 4 is a perspective view of the surrounding of the engine 3 of the motorcycle 1 according to the illustrative embodiment. FIG. 5 is a plan view of the surrounding of the engine 3 of the motorcycle 1 according to the illustrative embodiment. FIGS. 6 and 7 are a front view and a rear view of the surrounding of the engine 3 of the motorcycle 1 according to the illustrative embodiment. FIG. 4 illustrates the surrounding of the engine 3, as seen from a front side of the motorcycle. Also, in FIGS. 6 and 7, the vehicle body frame 2 is shown for convenience of explanations.

As shown in FIGS. 3 and 4, the mug cover 35 has a disc-shaped part 351 having a substantial disc shape, as seen from a side, and a side surface part 352 extending inwards from a peripheral edge portion of the disc-shaped part 351 in the width direction of the motorcycle. The clutch actuator 41 and the shift actuator 42 are arranged around the disc-shaped part 351, as seen from a side. In this case, the clutch actuator 41 and the shift actuator 42 are arranged along a circumferential direction of the disc-shaped part 351, as seen from a side.

The clutch actuator 41 is arranged at a position behind the disc-shaped part 351 at the left of the engine case 30, as seen from a side. The shift actuator 42 is arranged at a position above the disc-shaped part 351 at the left of the cylinder 31, as seen from a side. The shift mechanism 37 is arranged behind the clutch actuator 41, as seen from a side. The shift actuator 42 is arranged opposite (i.e., at a front side) to the shift mechanism 37 in the front and rear direction with the clutch actuator 41 being interposed therebetween.

As described in detail later, the clutch actuator 41 and the shift actuator 42 include motor units 411, 421 having substantially cylindrical shapes and speed reduction mechanisms 412, 422 coupled to the motor units 411, 421, respectively. The clutch actuator 41 and the shift actuator 42 are arranged so that axial directions of the motor units 411, 421 extend in a direction (more specifically, a direction parallel with the front and rear direction of the motorcycle) orthogonal to the width direction of the motorcycle (a depth direction of the paper surface of FIGS. 3 and 4). The clutch actuator 41 and the shift actuator 42 are arranged to face each other at the side surface part 352 of the mug cover 35.

In the AMT 40 according to the illustrative embodiment, the clutch actuator 41 and the shift actuator 42 are arranged orthogonal to the width direction of the motorcycle. Consequently, it is possible to reduce a space required to arrange the clutch actuator 41 and the shift actuator 42, in the width direction of the motorcycle. Thereby, it is possible to reduce a size of the engine 3 in the width direction of the motorcycle by making maximum use of the spaces around the mug cover 35.

In the clutch actuator 41 and the shift actuator 42, the speed reduction mechanisms 412, 422 are arranged at positions at a side of the vehicle body frame 2 which is arranged at the upper side (more specifically, positions at a side of the tank rails 22). The motor units 411, 421 are respectively arranged opposite to the vehicle body frame 2 with the speed reduction mechanisms 412, 422 being interposed therebetween. The motor units 411, 421 are configured to be detachable from the speed reduction mechanisms 412, 422 towards the opposite side to the vehicle body frame 2.

The clutch actuator 41 is arranged so that an axial direction of the motor unit 411 extends in the upper and lower direction. The motor unit 411 is arranged below the speed reduction mechanism 412. The shift actuator 42 is arranged so that an axial direction of the motor unit 421 extends in a slightly upward direction towards the rear. The motor unit 421 is arranged at a slightly downward position in front of the speed reduction mechanism 422. That is, tip end portions (lower end portions) of the motor units 411, 421 are arranged to face towards the different directions.

In the AMT 40 according to the illustrative embodiment, the respective motor units 411, 421 are arranged opposite to the vehicle body frame 2 with the speed reduction mechanisms 412, 422 being interposed therebetween. Consequently, it is possible to improve the operation efficiency upon maintenance of the clutch actuator 41 and the shift actuator 42. In particular, the motor units 411, 421 are configured to be detachable from the speed reduction mechanisms 412, 422 to the opposite side to the vehicle body frame 2. Consequently, it is possible to attach and detach the motor units 411, 421 without interfering with the vehicle body frame 2 upon maintenance of the clutch actuator 41 and the shift actuator 42 and the like, so that it is possible to improve the operation efficiency.

As shown in FIGS. 6 and 7, the clutch actuator 41 and the shift actuator 42 are arranged inside an outer end face (a left end face) of the mug cover 35. In FIGS. 6 and 7, a plane passing the outer end face of the mug cover 35 is denoted with a dotted line MC, for convenience of explanations. In this way, the clutch actuator 41 and the shift actuator 42 are arranged inside the outer end face of the mug cover 35 which has stiffness, so that it is possible to avoid a situation where the clutch actuator 41 and the shift actuator 42 comes in contact with a road surface or the like when the motorcycle 1 is turned over, for example. Consequently, it is possible to suppress a situation where the clutch actuator 41 and the shift actuator 42 are to be damaged. Also, it is possible to make it difficult for a driver or the like to come in contact with the actuators 41, 42.

As shown in FIG. 3, a sprocket cover 50 is provided at the rear of the clutch actuator 41 above the shift mechanism 37, as seen from a side. The sprocket cover 50 is configured to cover a sprocket on which a chain for transmitting a driving force to the rear wheel 11 is wound. The sprocket cover 50 is arranged inside the clutch actuator 41 in the width direction of the motorcycle, at the front of the body frame 23.

The clutch actuator 41 is fixed to the sprocket cover 50. As shown in FIGS. 4 and 5, the clutch actuator 41 is fixed from above to a flange part 501 which is arranged at an upper part of the sprocket cover 50, with three screws 502a to 502c (the screws 502b, 502c are not shown in FIG. 4. Refer to FIG. 5). The clutch actuator 41 is fixed to the flange part 501 at a part of the speed reduction mechanism 412. The motor unit 411 is arranged so as to extend in the upper and lower direction outside the sprocket cover 50 (refer to FIG. 4).

The shift actuator 42 is fixed to the mug cover 35. As shown in FIG. 4, the shift actuator 42 is fixed from the left to bosses 353 which are arranged on a side surface of the mug cover 35, with two screws 353a, 353b. The shift actuator 42 is fixed to the bosses 353 at a part of the speed reduction mechanism 422. The motor unit 421 is arranged so as to extend in the front and rear direction outside the mug cover 35 (refer to FIG. 3).

In the illustrative embodiment, the clutch actuator 41 and the shift actuator 42 are mounted to the engine case 30 via the mug cover 35. Consequently, it is possible to effectively reduce an influence of heat generated from the engine case 30 without providing a special member such as a bracket, which is required in the related art.

Figure 8:
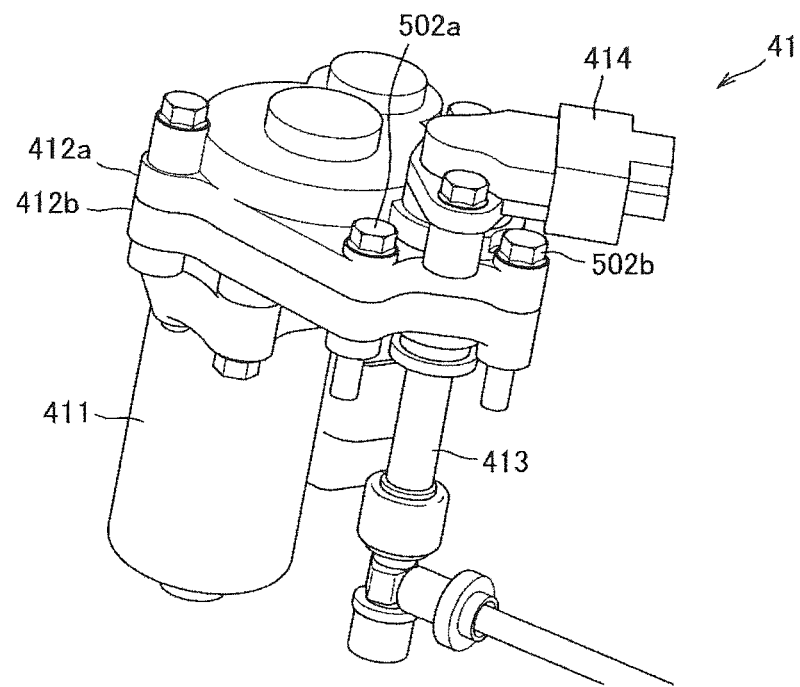
FIG. 8 is a perspective view of a clutch actuator provided in the motorcycle according to the illustrative embodiment.
Figure 9:
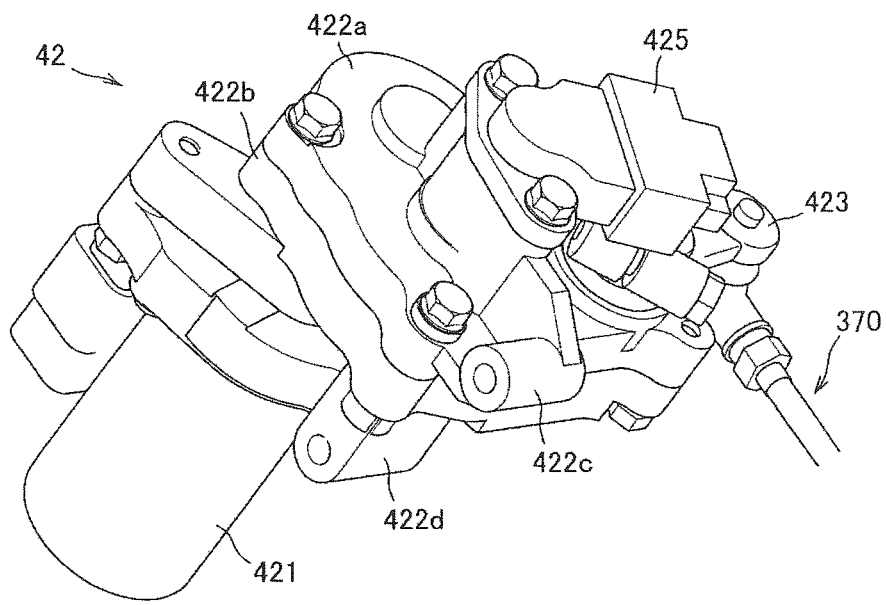
FIG. 9 is a perspective view of a shift actuator provided in the motorcycle according to the illustrative embodiment.

Configurations of the clutch actuator 41 and the shift actuator 42 are described with reference to FIGS. 8 and 9. FIG. 8 is a perspective view of the clutch actuator 41 provided in the motorcycle 1 according to the illustrative embodiment. FIG. 9 is a perspective view of the shift actuator 42 provided in the motorcycle 1 according to the illustrative embodiment.

As shown in FIG. 8, in the clutch actuator 41, the speed reduction mechanism 412 is coupled to the upper part of the motor unit 411. The speed reduction mechanism 412 has a pair of cases 412a, 412b which are superimposed in the upper and lower direction. In the cases 412a, 412b, a plurality of speed reduction gears configured to mesh with each other are accommodated. Of the speed reduction gears, a gear arranged at the most upstream side is fixed to an output shaft of the motor unit 411 and is configured to rotate together with the output shaft of the motor unit 411. Also, of the speed reduction gears, a gear arranged at the most downstream side is fixed to a release cam 413 and is configured to rotate the release cam 413. The release cam 413 is configured to switch disconnection and connection of the clutch mechanism.

The clutch actuator 41 is provided with a rotation sensor 414 configured to detect rotation of the release cam 413. As described above, the clutch actuator 41 is fixed to the sprocket cover 50 with the screws 502a to 502c (the screws 502c is not shown in FIG. 8) arranged around the rotation sensor 414. The motor unit 411 of the clutch actuator 41 is driven in response to an instruction from an ECU (not shown), so that the disconnection and connection of the clutch mechanism are switched through the rotation of the release cam 413. The rotation sensor 414 can detect the disconnection and connection states of the clutch mechanism, in response to the rotation of the release cam 413.

The shift actuator 42 has substantially the same configuration as the clutch actuator 41. As shown in FIG. 9, in the shift actuator 42, the speed reduction mechanism 422 is coupled to the upper part of the motor unit 421. The speed reduction mechanism 422 has a pair of cases 422a, 422b which are superimposed in the upper and lower direction. The cases 422a, 422b are provided with bosses 422c, 422d arranged to face the bosses 353 of the mug cover 35, respectively. The bosses 422c, 422d are arranged to face the bosses 353 of the mug cover 35, which are then fastened with the screws 353b, 353a, so that the shift actuator 42 is fixed to the mug cover 35 (refer to FIG. 4).

In the cases 422a, 422b, a plurality of speed reduction gears configured to mesh with each other are accommodated. Of the speed reduction gears, a gear arranged at the most upstream side is fixed to an output shaft of the motor unit 421 and is configured to rotate together with the output shaft of the motor unit 421. Also, of the speed reduction gears, a gear arranged at the most downstream side is fixed to a first shift arm 423 and is configured to swing the first shift arm 423. The first shift arm 423 is configured to axially move a link mechanism 370 coupled to the shift mechanism 37. A configuration of the link mechanism 370 will be described later.

The shift actuator 42 has a swing sensor 425 configured to detect swing of the first shift arm 423. The motor unit 421 is driven, in response to an instruction from the ECU (not shown), so that a shift of the shift mechanism 37 is switched through the swing of the first shift arm 423. The swing sensor 425 can detect a shift state of the shift mechanism 37, in response to the swing of the first shift arm 423.

Figure 10:
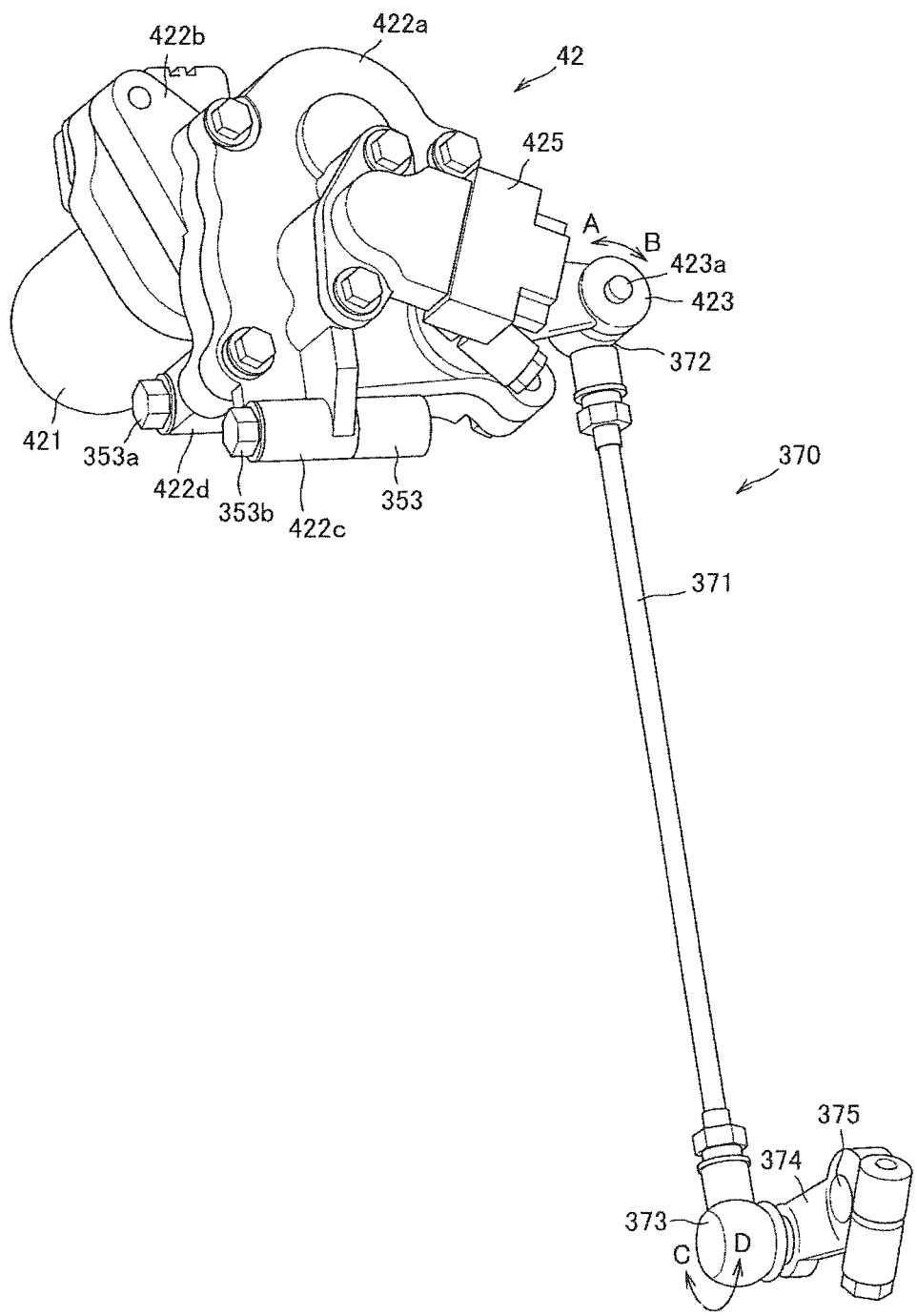
FIG. 10 is a perspective view of a link mechanism that is to be coupled to a shift mechanism provided in the motorcycle according to the illustrative embodiment.
Figure 11:
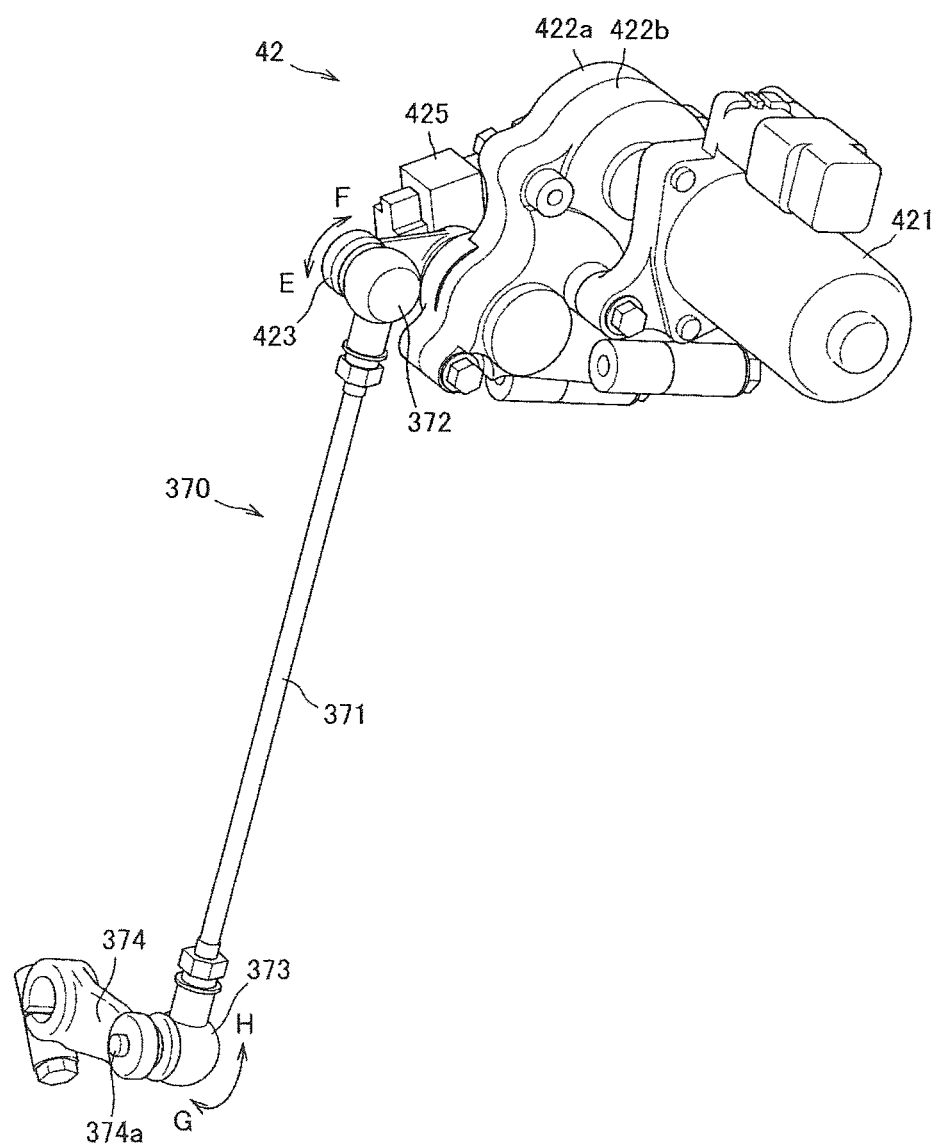
FIG. 11 is a perspective view of the link mechanism that is to be coupled to the shift mechanism provided in the motorcycle according to the illustrative embodiment.

The configuration of the link mechanism 370 configured to couple the shift actuator 42 and the shift mechanism 37 is described. FIGS. 10 and 11 are perspective views of the link mechanism 370 that is to be coupled to the shift mechanism 37 provided in the motorcycle 1 according to the illustrative embodiment. FIG. 10 illustrates the link mechanism 370, as seen from the rear of the motorcycle, and FIG. 11 illustrates the link mechanism 370, as seen from the front of the motorcycle. In FIGS. 10 and 11, the shift actuator 42 is also illustrated for convenience of explanations.

As shown in FIGS. 10 and 11, the link mechanism 370 has a link rod 371 and first and second pillow ball bearings 372, 373 arranged at both ends of the link rod 371. The link rod 371 has a length capable of coupling the shift actuator 42 and the shift mechanism 37. The link rod 371 extends substantially in the upper and lower direction, as seen from a side, extends with being slightly inclined towards the front of the motorcycle from the rear of the motorcycle (refer to FIG. 3) and couples the shift mechanism 37 and the shift actuator 42. In other words, the link rod 371 is configured to couple the shift actuator 42 arranged above the mug cover 35 and the shift mechanism 37 arranged below the counter shaft 302. Consequently, it is possible to efficiently utilize the space separated in the upper and lower direction around the engine 3.

The link rod 371 is coupled from the shift mechanism 37 to the shift actuator 42 through an inside of the clutch actuator 41 in the width direction of the motorcycle (refer to FIG. 4). As the link rod 371 is arranged inside the clutch actuator 41, the link rod 371 does not interfere with the maintenance operation of the clutch actuator 41 and the like. Consequently, it is possible to improve the operation efficiency upon the maintenance of the clutch actuator 41.

The first pillow ball bearing (hereinafter, simply referred to as "first pillow ball") 372 is rotatably coupled to the first shift arm 423 of the shift actuator 42. The second pillow ball bearing (hereinafter, simply referred to as "second pillow ball") 373 is rotatably coupled to the second shift arm 374 of the shift mechanism 37. The second shift arm 374 is fixed to a shift shaft 375 supported by the shift mechanism 37 and is configured to be swingable about the shift shaft 375 (refer to FIG. 10). The shift shaft 375 is configured to be rotatable in conjunction with the swing of the second shift arm 374.

In the first pillow ball 372, a pillow ball (not shown) is accommodated. The pillow ball is kept to be rotatable in an arrow A-B direction shown in FIG. 10, about a coupling shaft 423a to the first shift arm 423, as a rotation center. Likewise, in the second pillow ball 373, a pillow ball (not shown) is accommodated. The pillow ball is kept to be rotatable in an arrow C-D direction shown in FIG. 10, about a coupling shaft 374a (refer to FIG. 11) to the second shift arm 374, as a rotation center.

As shown in FIGS. 10 and 11, a coupling direction of the first pillow ball 372 with respect to the first shift arm 423 and a coupling direction of the second pillow ball 373 with respect to the second shift arm 374 are arranged to be orthogonal to each other. That is, the first pillow ball 372 is coupled to the first shift arm 423 towards the rear of the motorcycle, whereas the second pillow ball 373 is coupled to the second shift arm 374 towards the width direction of the motorcycle. When the first shift arm 423 swings in an E-F direction shown in FIG. 11 in conjunction with the driving of the motor unit 421, the second shift arm 374 swings in an G-H direction shown in FIG. 11. In this way, as the coupling direction of the first pillow ball 372 and the coupling direction of the second pillow ball 373 are arranged to be orthogonal to each other, it is possible to appropriately transmit the swing operation of the first shift arm 423 to the second shift arm 374 extending in the orthogonal direction.

In the illustrative embodiment, the shift mechanism 37 and the shift actuator 42 are coupled with each other by the link mechanism 370. By using the link mechanism 370, it is possible to flexibly utilize the separated space around the engine 3. Particularly, in the illustrative embodiment, the link mechanism 370 includes the link rod 371 and the pair of pillow balls (the first and second pillow balls 372, 373) and the rotation axis of one of the pair of pillow balls (the first pillow ball 372) is arranged to be orthogonal to the rotation axis of the other of the pair of pillow balls (the second pillow ball 373). Accordingly, it is possible to arrange the output shaft of the shift actuator 42 and the shift shaft 375 of the shift mechanism 37 to be orthogonal to each other. Consequently, it is possible to flexibly select the spaces in which the shift actuator 42 and the shift mechanism 37 are to be arranged.

As shown in FIG. 3, a shift detection mechanism 51 is provided outside (the left side) the sprocket cover 50. The shift detection mechanism 51 is configured to detect a shift change instruction that is to be input from a shift pedal 52. The shift pedal 52 is swingably supported by a footrest bracket 54 (refer to FIG. 12). The shift detection mechanism 51 is provided with a shift sensor 511 configured to detect a swing operation of a link arm 531 of a link mechanism 53 (which will be described later). The shift sensor 511 is configured to detect a shift change instruction from a driver by detecting the swing operation of the link arm 531.

Figure 12:
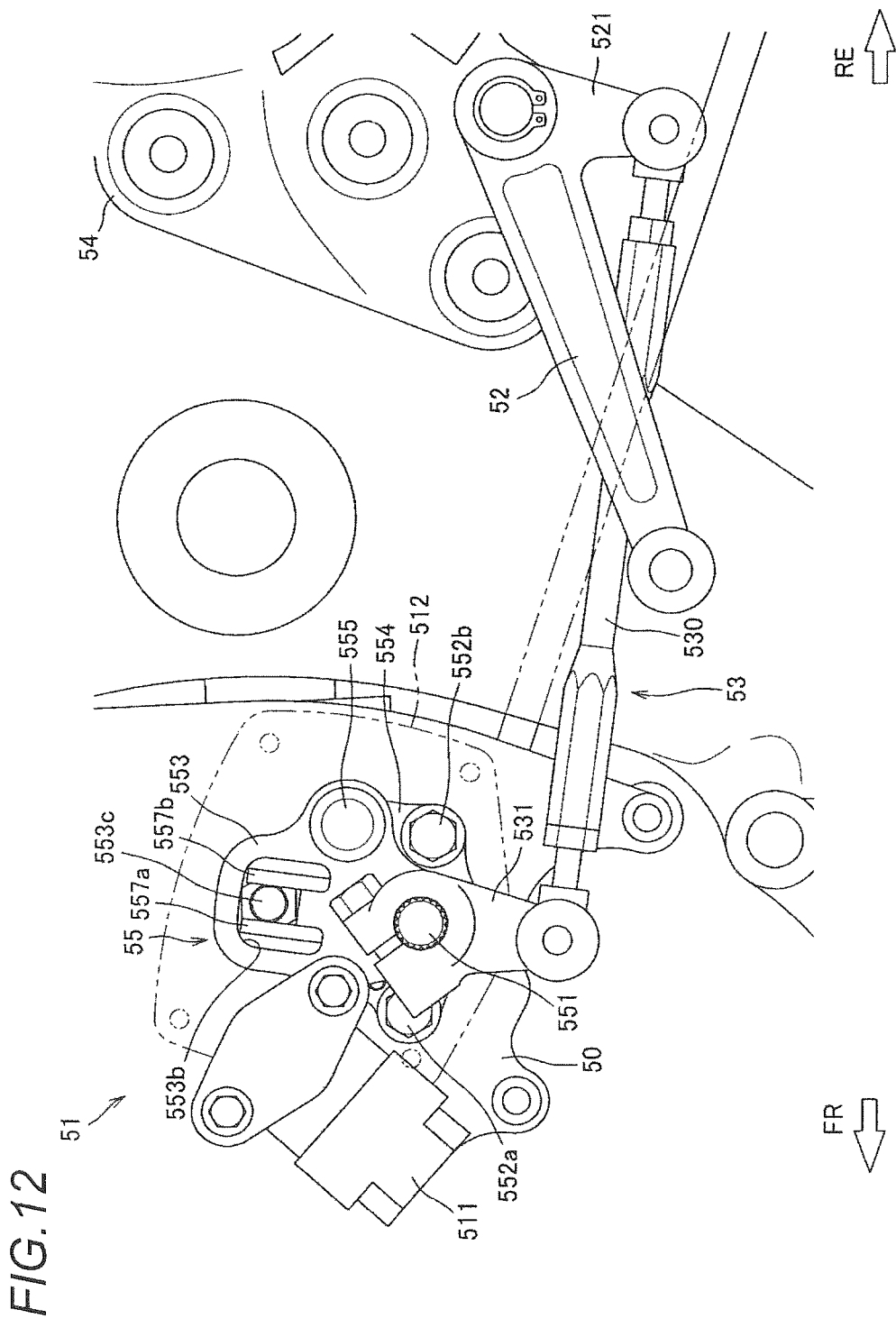
FIG. 12 is an enlarged view of a surrounding of a shift detection mechanism provided in the motorcycle according to the illustrative embodiment.
Figure 13:
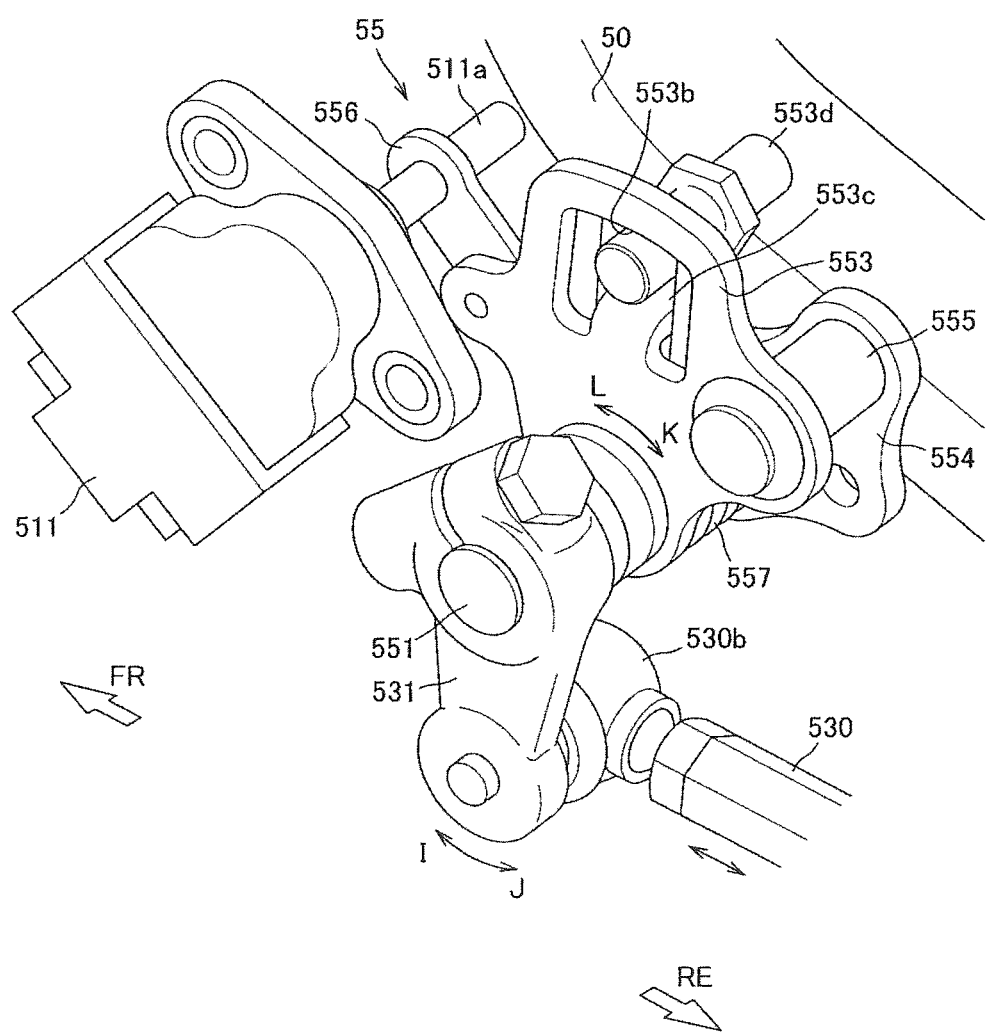
FIG. 13 is a perspective view of a surrounding of a shift detection unit within the shift detection mechanism provided in the motorcycle according to the illustrative embodiment.
Figure 14A:
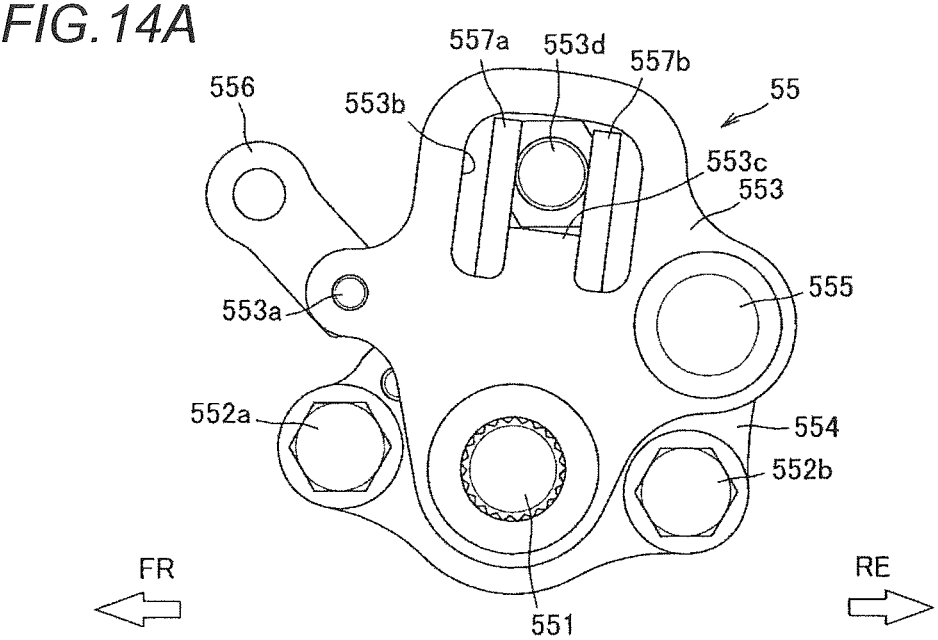
FIG. 14A is a front view of the shift detection unit within the shift detection mechanism provided in the motorcycle according to the illustrative embodiment.
Figure 14B:
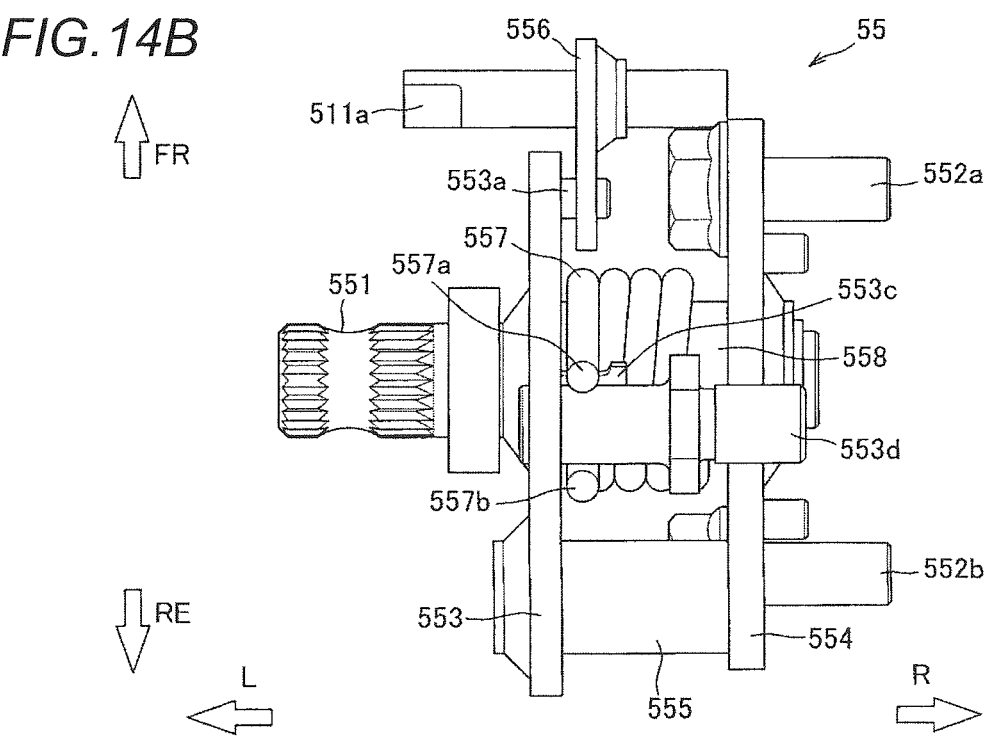
FIG. 14B is a side view of the shift detection unit within the shift detection mechanism provided in the motorcycle according to the illustrative embodiment.

The configuration of the shift detection mechanism 51 is described with reference to FIGS. 12, 13, 14A, and 14B. FIG. 12 is an enlarged view of a surrounding of the shift detection mechanism 51 provided in the motorcycle 1 according to the illustrative embodiment. In FIG. 12, for convenience of explanations, a cover 512 of the shift detection mechanism 51 is illustrated with a dashed-two dotted line, to show a shift detection unit 55 in the cover 512. FIG. 13 is a perspective view of a surrounding of the shift detection unit 55 in the shift detection mechanism 51 provided in the motorcycle 1 according to the illustrative embodiment. FIG. 14A is a front view of the shift detection unit 55 in the shift detection mechanism 51 provided in the motorcycle 1 according to the illustrative embodiment. FIG. 14B is a side view of the shift detection unit 55 in the shift detection mechanism 51 provided in the motorcycle 1 according to the illustrative embodiment.

As shown in FIG. 12, the shift detection mechanism 51 has a cover 512 having a space therein. The cover 512 has a substantially rectangular shape, as seen from a side, and is fixed at four corners thereof to the sprocket cover 50 (refer to FIG. 15). A shift sensor 511 is provided outside the cover 512 and at a lower part, at a side surface, and at the front side of the motorcycle. Also, the link arm 531 of the link mechanism 53 (which will be described later) is provided outside the cover 512 and at a lower part, at the side surface, and in the vicinity of the center. The link arm 531 is fixed to a link shaft 551 of a shift detection unit 55 (which will be described later), and is configured to be swingable about the link shaft 551.

In the cover 512, the shift detection unit (a detection unit) 55 is accommodated. In the cover 512, the shift detection unit 55 is fixed to a side surface of the sprocket cover 50 via the cover 512 with a pair of screws 552a, 552b. The shift detection unit 55 is provided with a pair of first and second shift plates 553, 554 through which the link shaft 551 passes.

Figure 15:
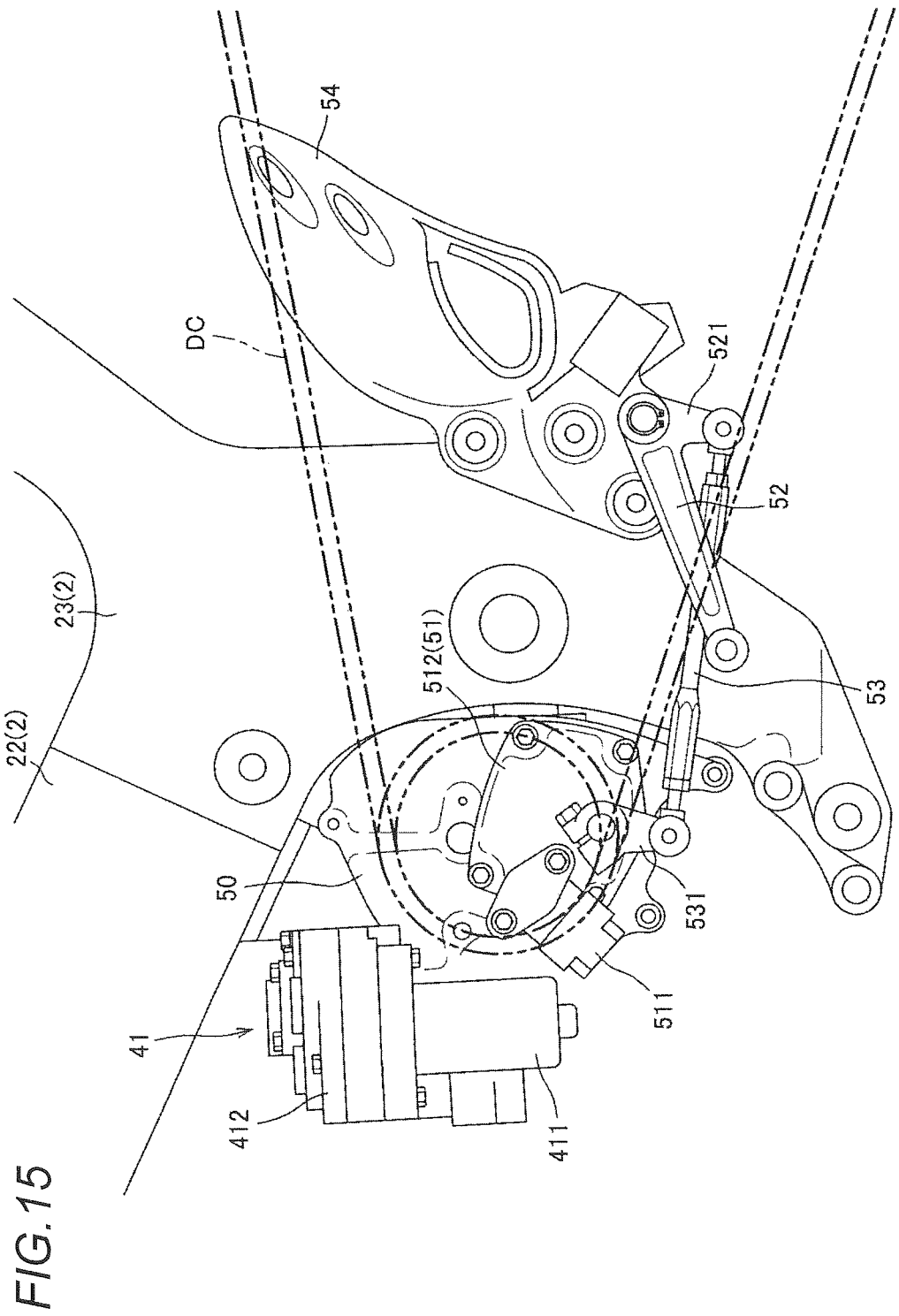
FIG. 15 is a side view of the surrounding of the shift detection mechanism provided in the motorcycle according to the illustrative embodiment.

The first and second shift plates 553, 554 have a substantially flat plate shape, respectively, and are arranged to face each other with a predetermined interval in the width direction of the motorcycle (refer to FIGS. 14A, 14B, and 15). As shown in FIG. 14A, the first and second shift plates 553, 554 are arranged to partially overlap with each other, as seen from a side. The second shift plate 554 has a shape protruding downwards from the first shift plate 553, as seen from a side. The screws 552a, 552b are arranged at the protruding part.

A cylindrical support shaft 555 is provided at a rear end portion of the first shift plate 553. The support shaft 555 protrudes from an inner surface of the first shift plate 553 towards the second shift plate 554. The support shaft 555 has a function of securing a distance between the first shift plate 553 and the second shift plate 554. The support shaft 555 is not fixed to the second shift plate 554.

In the support shaft 555, a click mechanism (not shown) configured to cause a tactile feedback (a click feeling) in conjunction with rotation of the first shift plate 553 is accommodated. The click mechanism is configured by a coil spring and a ball member, for example. The ball member is pressed to the second shift plate 554 by an urging force of the coil spring. The second shift plate 554 is formed with a concave part for accommodating therein a part of the ball member in a state where the first shift plate 553 is arranged at an initial position. When the first shift plate 553 rotates, the ball member separates from the concave part, and when the first shift plate 553 returns to its initial position, the ball member enters the concave part, thereby causing the click feeling.

A front end portion of the first shift plate 553 is provided with a link member 556 coupled to a shaft part 511a of the shift sensor 511. The link member 556 is arranged inside the first shift plate 553. The link member 556 is configured to accommodate a shaft part 553a (refer to FIG. 14B) of the first shift plate 553 by a hole formed at a rear end portion thereof and to be thereby rotatably supported by the first shift plate 553. A front end portion of the link member 556 is fixed to the shaft part 511a of the shift sensor 511. The shaft part 511a rotates in conjunction with rotation of the link member 556.

A central upper part of the first shift plate 553 is formed with an opening 553b. The opening 553b is provided with a tongue piece part 553c formed in the width direction of the motorcycle. Also, a shaft part 553d passing through the opening 553b in the width direction of the motorcycle is arranged in the opening 553b. The shaft part 553d is fixed to an upper surface of the tongue piece part 553c by welding or the like. The shaft part 553d is configured to be engaged with arm parts 557a, 557b of a torsion spring 557 (which will be described later).

An outer surface of the second shift plate 554 is provided with a boss 558 protruding towards the first shift plate 553. The boss 558 has a cylindrical shape and is configured to accommodate therein the link shaft 551. A torsion spring 557 is fixed to an outer periphery of the boss 558. The torsion spring 557 has a pair of bowl parts 557a, 557b. The bowl parts 557a, 557b are arranged to interpose the shaft part 553d therebetween.

The torsion spring 557 has a function of applying an urging force for returning the first shift plate 553 to its initial position (a position shown in FIGS. 12 to 14B). As described in detail later, after the first shift plate 553 rotates on the basis of an operation on the shift pedal 52, the first shift plate 553 returns to its initial position by the urging force of the torsion spring 557.

The shift detection unit 55 may be fixed to the sprocket cover 50 via the cover 512 after mounting the first shift plate 553 as a moveable side and the second shift plate 554 as a fixed side. The fixation to the sprocket cover 50 is made by the screws 552a, 552b. As described above, the screws 552a, 552b are arranged at positions at which they are exposed from the first shift plate 553, as seen from a side. Accordingly, when fixing the shift detection unit 55 to the sprocket cover 50, the first shift plate 553 does not cause any interference. As the first shift plate 553 and the second shift plate 554 are assembled and are then fixed to the sprocket cover 50, it is possible to improve the operation efficiency when mounting the shift detection unit 55.

The shift detection mechanism 51 configured as described above is arranged at a position overlapping with a drive chain for transmitting the driving power to the rear wheel 11. A relation between the shift detection mechanism 51 and the drive chain is described with reference to FIG. 15. FIG. 15 is a side view of a surrounding of the shift detection mechanism 51 provided in the motorcycle 1 according to the illustrative embodiment. In FIG. 15, for convenience of explanations, a drive chain DC is pictorially illustrated with a dashed-two dotted line.

As shown in FIG. 15, the shift detection mechanism 51 is arranged at a position overlapping with the drive chain DC, as seen from a side. More specifically, the cover 512 of the shift detection mechanism 51 is arranged at a lower part outside the sprocket cover 50, i.e., at a position overlapping with the drive chain DC. Accordingly, the sprocket cover 50 and the cover 512 of the shift detection mechanism 51 are arranged outside the drive chain DC. With a double structure of the sprocket cover 50 and the cover 512, it is possible to achieve a sound deadening effect and to reduce a driving sound caused due to the rotation of the drive chain DC.

The cover 512 of the shift detection mechanism 51 is mounted to a side surface of the sprocket cover 50 and the shift sensor 511 is arranged outside the cover 512. As the shift sensor 511 configured to detect the rotation of the shift detection unit 55 is arranged in a space different from the shift detection unit 55 with the cover 512 being interposed therebetween, it is possible to prevent a situation where the shift sensor 511 is to be damaged due to foreign matters involved by the drive chain DC.

Further, the shift detection unit 55 is arranged behind the clutch actuator 41 and the shift sensor 511 is arranged between the clutch actuator 41 and the shift detection unit 55 (refer to FIGS. 12 and 15). Accordingly, it is possible to arrange the shift sensor 511 in the vicinity of the clutch actuator 41 and inside an outer end face of the clutch actuator 41. Consequently, it is possible to protect the shift sensor 511 susceptible to a shock and the like by the clutch actuator 41.

Figure 16:
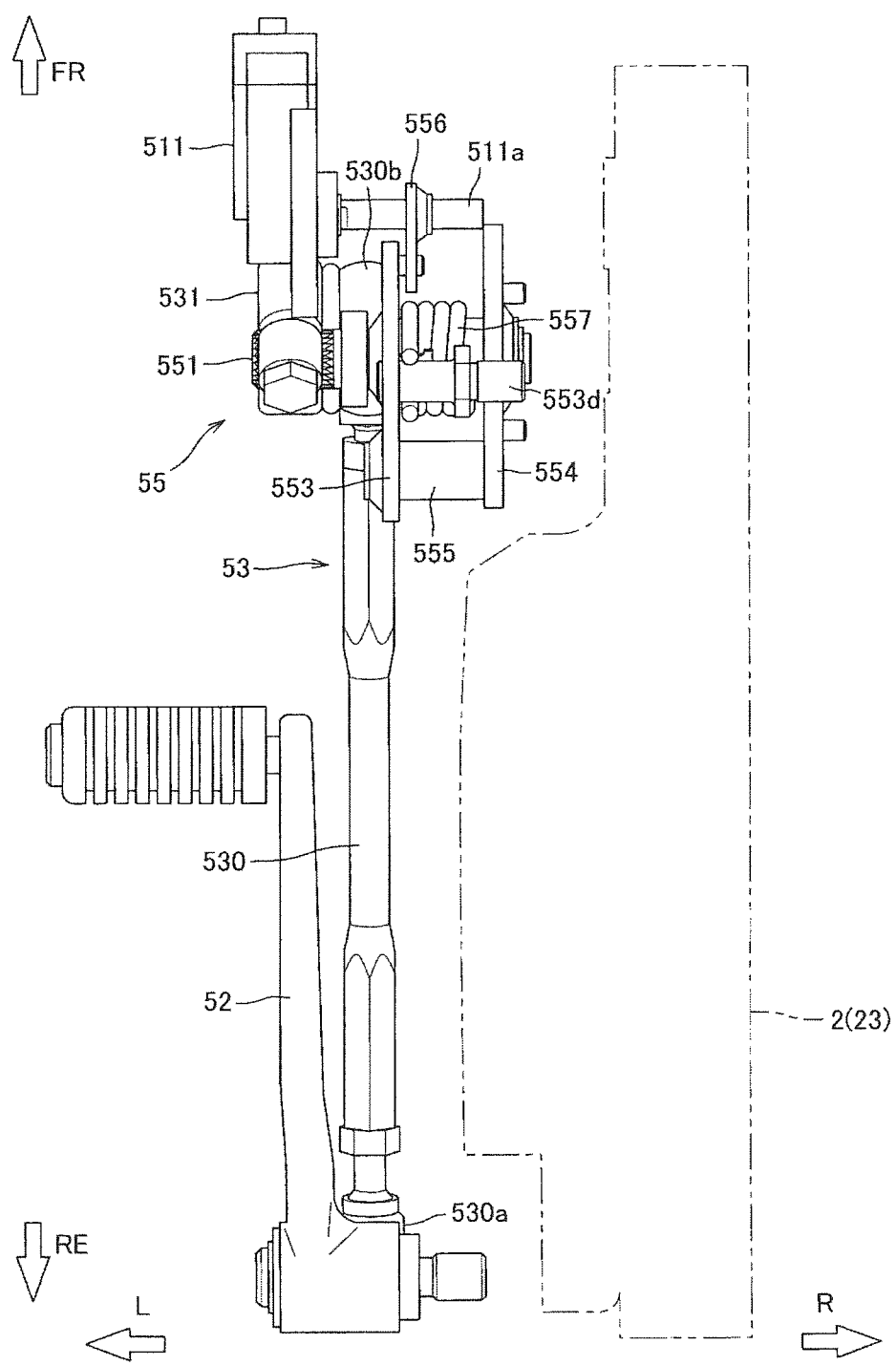
FIG. 16 is a plan view of a surrounding of the shift detection mechanism and the link mechanism provided in the motorcycle according to the illustrative embodiment.
Figure 17:
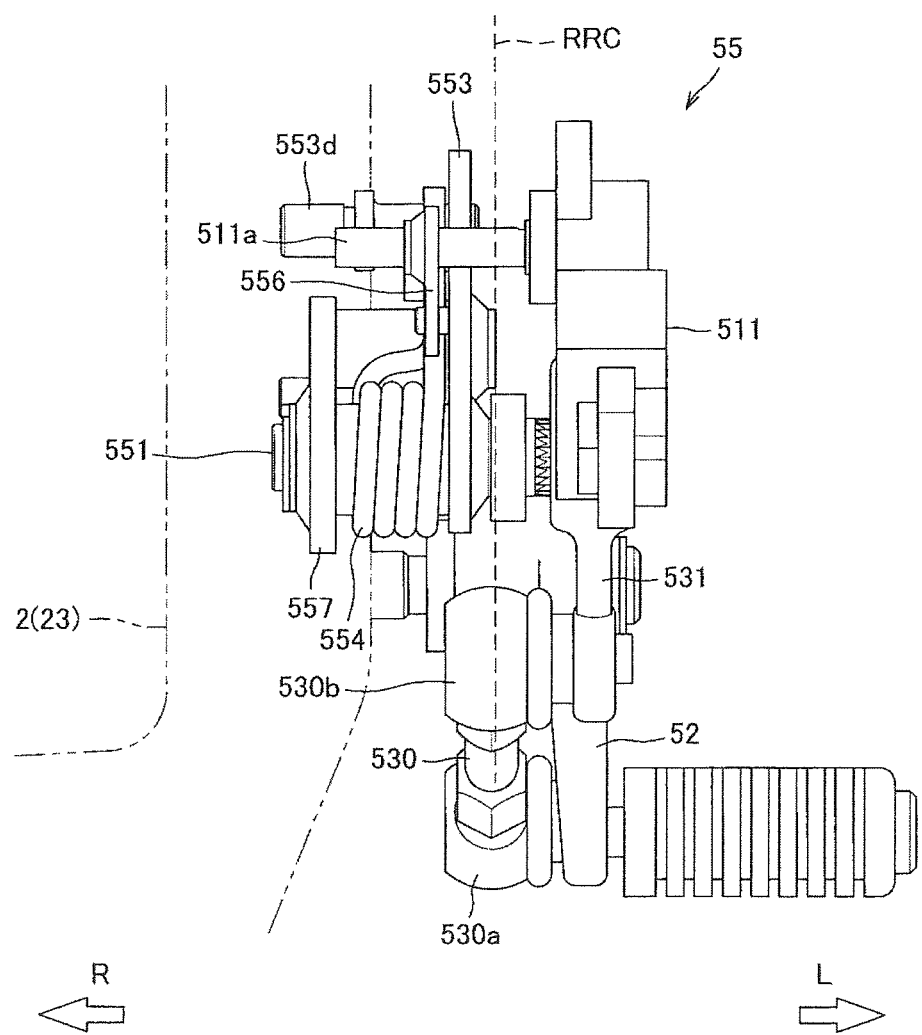
FIG. 17 is a front view of the surrounding of the shift detection mechanism and the link mechanism provided in the motorcycle according to the illustrative embodiment.

Subsequently, the configuration of the link mechanism 53 is described with reference to FIGS. 12, 13, 16 and 17. FIGS. 16 and 17 are a plan view and a front view of a surrounding of the shift detection mechanism 51 and the link mechanism 53 provided in the motorcycle 1 according to the illustrative embodiment. In FIGS. 16 and 17, for convenience of explanations, the cover 512 of the shift detection mechanism 51 is omitted, and the vehicle body frame 2 (the body frame 23) is shown with dashed-two dotted lines.

As shown in FIGS. 12 and 16, the link mechanism 53 has a link rod 530 extending in the front and rear direction of the motorcycle and a link arm 531 coupled to the link rod 530. A rear end portion of the link rod 530 is coupled to a tip end of a protruding piece 521 protruding downwards from a base end portion of the shift pedal 52. A front end portion of the link rod 530 is coupled to a lower end portion of the link arm 531.

The link rod 530 is coupled to the protruding piece 521 and the link arm 531 via pillow ball bearings 530a, 530b, respectively (refer to FIG. 17). As the link rod 530 is coupled via the pillow ball bearings 530a, 530b, the link rod 530 is configured to be movable in the front and rear direction of the motorcycle while permitting rotations of the shift pedal 52 and the link arm 531.

As shown in FIG. 17, the link arm 531 is arranged outside a center RRC of the link rod 530 in the width direction of the motorcycle. With this arrangement, the first shift plate 533 and the pillow ball bearings 530a, 530b can overlap with each other, as seen from a front side. Accordingly, it is possible to effectively utilize the space between the shift pedal 52 and the drive chain DC.

When the link rod 530 operates in the front and rear direction of the motorcycle, in response to an operation on the shift pedal 52, the link arm 531 swings in an arrow I-J direction shown in FIG. 13, about the link shaft 551 serving as a swing support point. When the link shaft 551 is rotated in conjunction with the swing of the link arm 531, the first shift plate 553 rotates in an arrow K-L direction shown in FIG. 13, about a center of the link shaft 551 serving as a rotation support point. The second shift plate 554 is fixed to the sprocket cover 50 and does not rotate. As the first shift plate 553 rotates, the link member 556 swings in the same direction. As the link member 556 swings, the shaft part 511a rotates. The shift sensor 511 detects the rotation of the shaft part 511a to detect a shift change instruction from the driver.

In the shift detection mechanism 51 configured to detect the shift change instruction, as described above, the link shaft 551 is configured as a separate shaft from the shaft part 511a, which is a detection target by the shift sensor 511. The link shaft 551 and the shaft part 511a extend in the width direction of the motorcycle at different positions deviated in the front and rear direction of the motorcycle. If the shaft part, which is a detection target, is arranged coaxially with the link shaft 551, a size of the shift detection mechanism 51 in the width direction of the motorcycle increases. In the shift detection mechanism 51 according to the illustrative embodiment, as the link shaft 551 and the shaft part 511a are arranged as separate shafts, it is possible to shorten the dimension of the shift detection mechanism 51 in the width direction of the motorcycle.

Since the size of the shift detection mechanism 51 in the width direction of the motorcycle is reduced, it is possible to arrange the shift detection mechanism 51 in the vicinity of the vehicle body frame 2 or the drive chain DC, as seen from above. Accordingly, it is possible to arrange the shift pedal 52 in the vicinity of the vehicle body frame 2. If the size of the shift detection mechanism 51 in the width direction of the motorcycle is large, it is necessary to arrange the shift detection mechanism 51 at an outer side in the width direction of the motorcycle and the shift pedal 52 is correspondingly arranged at an outer side. As a result, a straddling width of the motorcycle 1 by a driver increases. In contrast, in the shift detection mechanism 51 according to the illustrative embodiment, the size of the shift detection mechanism 51 in the width direction of the motorcycle is reduced, so that the straddling width can be reduced. Consequently, it is possible to provide the motorcycle 1 that a driver can easily drive.

In the motorcycle 1 according to the illustrative embodiment, the configuration of the link mechanism 53 has been described on the assumption that the AMT is mounted on the motorcycle. In general, regarding the motorcycle 1, even when the vehicle type is the same, a motorcycle on which the AMT is not mounted is also manufactured around the same time. For this reason, as an illustrative embodiment, it is preferable to commonly use the configuration of the link mechanism 53 in the motorcycles of which specifications of the transmission devices are different.

Figure 18A:
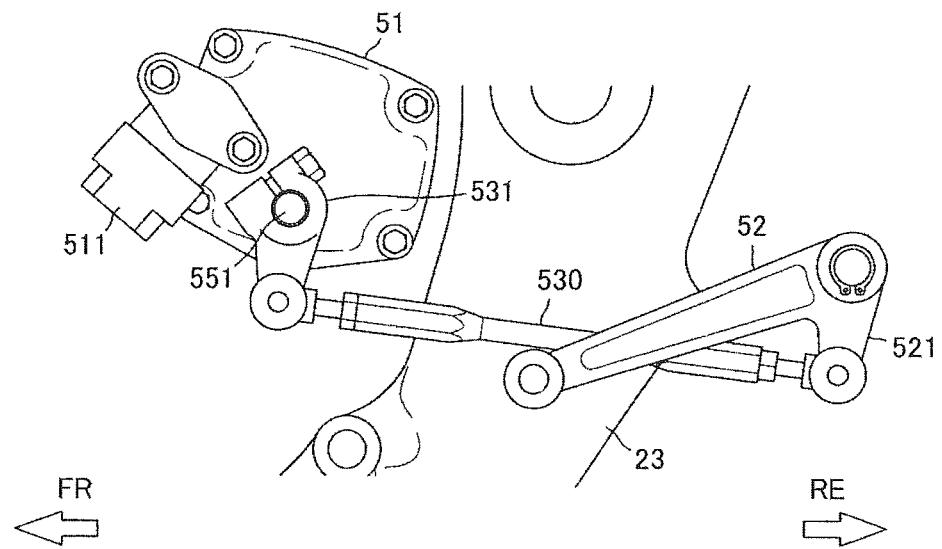
FIGS. 18A and 18B are side views of the link mechanism provided in the motorcycle according to the illustrative embodiment.
Figure 18B:
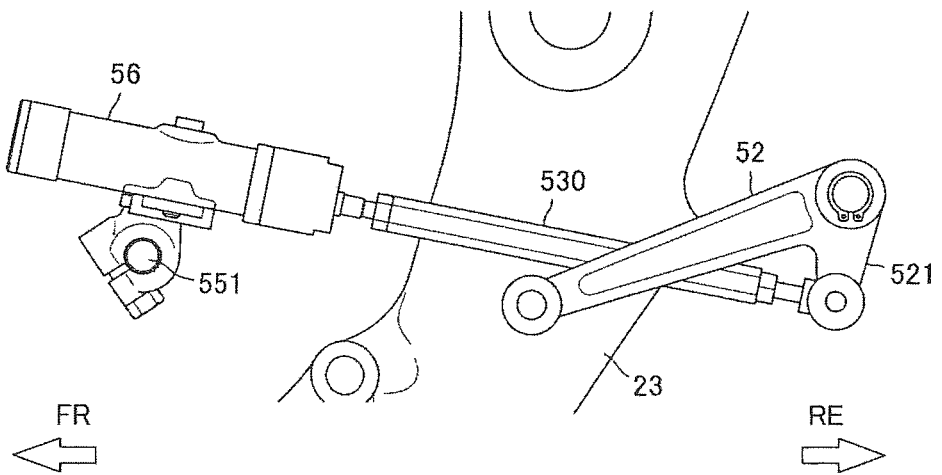

The configuration of the link mechanism 53 is described in a case where the AMT is not mounted on the motorcycle 1 according to the illustrative embodiment. FIGS. 18A and 18B are side views of a surrounding of the link mechanism 53 provided in the motorcycle 1 according to the illustrative embodiment. FIG. 18A illustrates a configuration of the link mechanism 53 in a case where the ATM is mounted, and FIG. 18B illustrates a configuration of the link mechanism 53 in a case where the ATM is not mounted. In FIG. 18B, for convenience of explanations, the common configurations to the illustrative embodiment are denoted with the same reference numerals and the descriptions thereof are omitted.

As shown in FIG. 18A, the link rod 530 of the link mechanism 53 according to the illustrative embodiment extends with being slightly inclined upwards towards the motorcycle front-side. The front end portion of the link rod 530 is coupled to the link arm 531.

On the other hand, as shown in FIG. 18B, a motorcycle on which the AMT is not mounted is provided with a quick shift sensor 56, for example, instead of the shift detection mechanism 51. In this case, the front end portion of the link rod 530 is coupled to the quick shift sensor 56. The quick shift sensor 56 constitutes a sensor for detecting an operation on the shift pedal 52 via the link rod 530. The link rod 530 is coupled to the link shaft 551 below the quick shift sensor 56, thereby directly rotating the link shaft 551.

As shown in FIG. 18B, even when the quick shift sensor 56 is provided, the link rod 530 of the link mechanism 53 extends with being slightly inclined upwards towards the motorcycle front-side. As shown in FIGS. 18A and 18B, the inclined angle of the link rod 530 is set to be substantially the same. That is, in the link mechanism 53 according to the illustrative embodiment, it is possible to set the extending direction of the link rod 530 to be substantially the same, irrespective of whether the AMT is mounted. Accordingly, it is possible to commonly use the link mechanism 53 in the same vehicle type of which the specifications of the transmission devices are different simply by changing the constitutional member to be coupled to the link rod 530. Consequently, it is not necessary to prepare the link mechanisms 53 having different configurations for each of the specifications, so that it is possible to save the manufacturing cost.

The present invention is not limited to the illustrative embodiment and can be diversely changed and implemented. In the illustrative embodiment, the sizes, shapes and the like shown in the accompanying drawings are not limited thereto and can be appropriately changed within the scope in which the effects of the present invention are to be achieved. In addition, the illustrative embodiment can be appropriately changed and implemented without departing from the purpose of the present invention.

For example, in the illustrative embodiment, the clutch actuator 41 and the shift actuator 42 are arranged inside the outer end face of the mug cover 35. However, the arrangement of the actuators is not limited thereto and can be appropriately changed. For example, the clutch actuator 41 and the shift actuator 42 may be arranged inside a line connecting the outer end face of the mug cover 35 and an outer end face of the vehicle body frame 2. Even in this case, it is possible to avoid a situation where the clutch actuator 41 and the shift actuator 42 come in contact with a road surface or the like when the motorcycle 1 is turned over, as well as the illustrative embodiment.

Also, in the illustrative embodiment, the AMT has been exemplified as the transmission device. However, the transmission device to be mounted on the motorcycle is not limited thereto and can be appropriately changed. For example, the present invention can also be applied to a motorcycle having a DCT as the transmission device, on the assumption that the clutch actuator and the shift actuator are provided.

As described above, the present invention achieves the effect of shortening the dimension of the shift detection mechanism in the width direction of the vehicle. In particular, the present invention is useful for any motorcycle having the shift actuator.

What is claimed is:

1. A vehicle shift control device comprising:
   a shift mechanism configured to shift and transmit rotation of a crankshaft extending in a vehicle width direction to a driving wheel;
   a shift pedal configured to receive a shift operation for the shift mechanism;
   a shift detection mechanism configured to detect a shift instructed via the shift pedal; and
   a shift actuator configured to perform the shift operation of the shift mechanism, in response to a detection content of the shift detection mechanism,
   wherein the shift detection mechanism comprises a detection unit configured to swing in response to the shift operation of the shift pedal and a sensor configured to detect swing of the detection unit,
   wherein the detection unit comprises a shift plate which swings with a link shaft that swings in response to an operation on the shift pedal,
   wherein the sensor detects rotation of a shaft part fixed to a link member which is coupled to the shift plate,
   wherein the link member is supported by the shift plate at a rear end portion of the link member, and a front end portion of the link member is fixed to the shaft part, and
   wherein the link shaft and the shaft part are arranged at different positions, as seen from the vehicle width direction.

2. The vehicle shift control device according to claim 1,
   wherein the shift detection mechanism comprises a cover configured to accommodate therein the detection unit, and
   wherein the cover is mounted to a sprocket cover.

3. The vehicle shift control device according to claim 2, wherein the sensor is arranged outside the cover.

4. The vehicle shift control device according to claim 1, wherein the shift mechanism is arranged below a counter shaft in a vehicle upper-below direction, the counter shaft is arranged behind the crankshaft in parallel with the crankshaft in the vehicle front-rear direction.

5. The vehicle shift control device according to claim 4, further comprising:
   a clutch actuator configured to perform a disconnection/connection operation of a clutch mechanism,
   wherein the detection unit is arranged behind the clutch actuator in the vehicle front-rear direction, and
   wherein the sensor is arranged between the clutch actuator and the detection unit in the vehicle front-rear direction.

6. The vehicle shift control device according to claim 1,
   wherein a vehicle body frame comprises a body frame which extends an upper and lower direction and which swingably supports a swing arm,
   wherein the sensor is arranged in front of the body frame, and
   wherein the shift pedal is arranged outside the body frame in the vehicle width direction and is arranged at a rear position than a front end of the body frame.

7. A vehicle shift control device comprising:
   a shift mechanism configured to shift and transmit rotation of a crankshaft extending in a vehicle width direction to a driving wheel;
   a shift pedal configured to receive a shift operation for the shift mechanism;
   a shift detection mechanism configured to detect a shift instructed via the shift pedal;
   a shift actuator configured to perform the shift operation of the shift mechanism, in response to a detection content of the shift detection mechanism;
   a counter shaft which is arranged behind the crankshaft in parallel with the crankshaft;
   a clutch mechanism provided at one end of the counter shaft and configured to transmit and disconnect rotation of the crankshaft to and from the counter shaft; and
   a clutch actuator configured to perform a disconnection/connection operation of the clutch mechanism,
   wherein the shift detection mechanism comprises a detection unit and a sensor, the detection unit comprises a shift plate which rotates about a first shaft part serving as a rotation support point in response to an operation on the shift pedal, the sensor is arranged at different position from the first shaft part as seen from a side of a vehicle and is configured to detect rotation of a second shaft part which rotates in response to a rotation of the shift plate,
   wherein the detection unit is arranged behind the clutch actuator,
   wherein the sensor is arranged between the clutch actuator and the detection unit,
   wherein the sensor is arranged inside an outer end face of the clutch actuator in the vehicle width direction,
   wherein a motor unit of the clutch actuator is arranged so that an axial direction of the motor unit extends in an upper and lower direction, and
   wherein the motor unit and the sensor are arranged at the same height as seen from the side of the vehicle.

8. The vehicle shift control device according to claim 7,
   wherein a vehicle body frame comprises a body frame which extends the upper and lower direction and which swingably supports a swing arm,
   wherein the sensor is arranged in front of the body frame, and
   wherein the shift pedal is arranged outside the body frame in the vehicle width direction and is arranged at a more rear position than a front end of the body frame.

* * * * *